United States Patent [19]

Patel

[11] Patent Number: 4,941,182

[45] Date of Patent: Jul. 10, 1990

[54] VISION SYSTEM AND METHOD FOR AUTOMATED PAINTING EQUIPMENT

[75] Inventor: Parashar Patel, Mount Clemens, Mich.

[73] Assignee: Phoenix Software Development Co., Sterling Heights, Mich.

[21] Appl. No.: 79,304

[22] Filed: Jul. 29, 1987

[51] Int. Cl.[5] .............................................. G06K 9/00
[52] U.S. Cl. ......................................... 382/1; 382/8;
118/697; 358/101; 901/43; 901/47
[58] Field of Search ............... 382/1, 8; 358/101, 107;
364/425, 463, 468; 901/43, 47; 198/341;
118/679, 680, 697, 326

[56] References Cited

U.S. PATENT DOCUMENTS

| | | |
|---|---|---|
| 3,709,190 | 1/1973 | Von Gottberg et al. ........... 118/680 |
| 4,278,046 | 7/1981 | Clarke et al. ......................... 901/43 |
| 4,421,800 | 12/1983 | Schoenberg et al. ............... 118/679 |
| 4,498,414 | 2/1985 | Kiba et al. .............................. 901/43 |
| 4,611,380 | 9/1986 | Abe et al. ............................ 118/697 |
| 4,614,300 | 9/1986 | Falcoff ................................ 118/697 |
| 4,639,878 | 1/1987 | Day et al. ........................... 358/107 |
| 4,714,044 | 12/1987 | Kikuchi et al. ..................... 118/697 |
| 4,754,415 | 6/1988 | George et al. ...................... 358/107 |

FOREIGN PATENT DOCUMENTS

| | | |
|---|---|---|
| 0204516 | 12/1986 | European Pat. Off. ................ 382/8 |
| 2123172A | 1/1984 | United Kingdom . |
| 2168174A | 6/1986 | United Kingdom . |

OTHER PUBLICATIONS

Gettelman, K., "Programmability and Sensing: Robot's New Dimensions", *Modern Machine Shop*, Jun., 1979, pp. 100–111.
A. Riad and M. Briot, "A Hierarchical Vision System for Object Identification and Localization", Proc. of 13th Intern. Symp. on Ind. Robots, vol. 2, Apr. 1983, pp. 17.1–17.10.
A Primer on Machine Vision and the IRI Vision Systems, (1985); Chapters and 2, pp. i, ii, 1-1 through 1-27 and 2-1 through 2-42.
Preliminary Product Bulletins (Undated) for PX/VR Variable Resolution System.
Preliminary Product Bulletins (Undated) for DX/VR Variable Resolution System.

*Primary Examiner*—Leo H. Boudreau
*Assistant Examiner*—Jose L. Couso
*Attorney, Agent, or Firm*—Harness, Dickey & Pierce

[57] ABSTRACT

A machine vision system used with automated painting equipment for object identification, intrustion-sensing and clearance monitoring. The vision system includes one or more cameras mounted at convenient clean locations where unique or distinctive visual attributes or features of the objects to be painted (such as automotive vehicle bodies or parts thereof) and the automated painting equipment may be seen. The camera acquires successive images of a first scene which includes at least a first movable object to be identified. Image processing steps performed on each image from the camera include recognizing selected pictorial attributes or features of the object and comparing the recognized attributes of the first object with corresponding reference data from a set of reference information about the object previously stored in the system. When a match between the reference data and the recognized attributes occurs, the vision system provides signals to programmable controllers which operate the automated painting equipment. Portions of the visual information acquired and/or generated by the vision system are selectively displayed upon one or more CRT monitors so that an operator/observer can verify correct operation of the vision system.

47 Claims, 7 Drawing Sheets

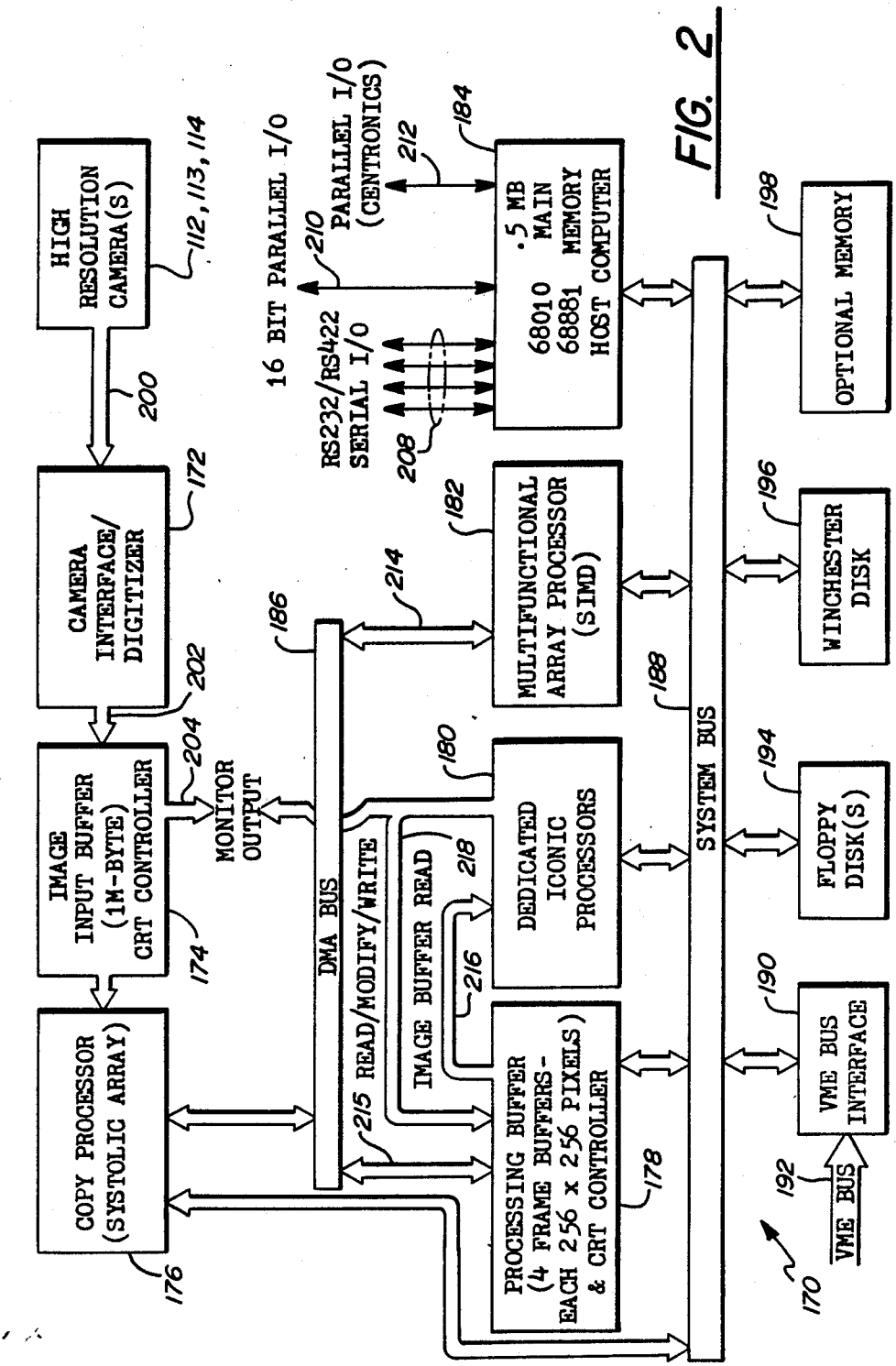

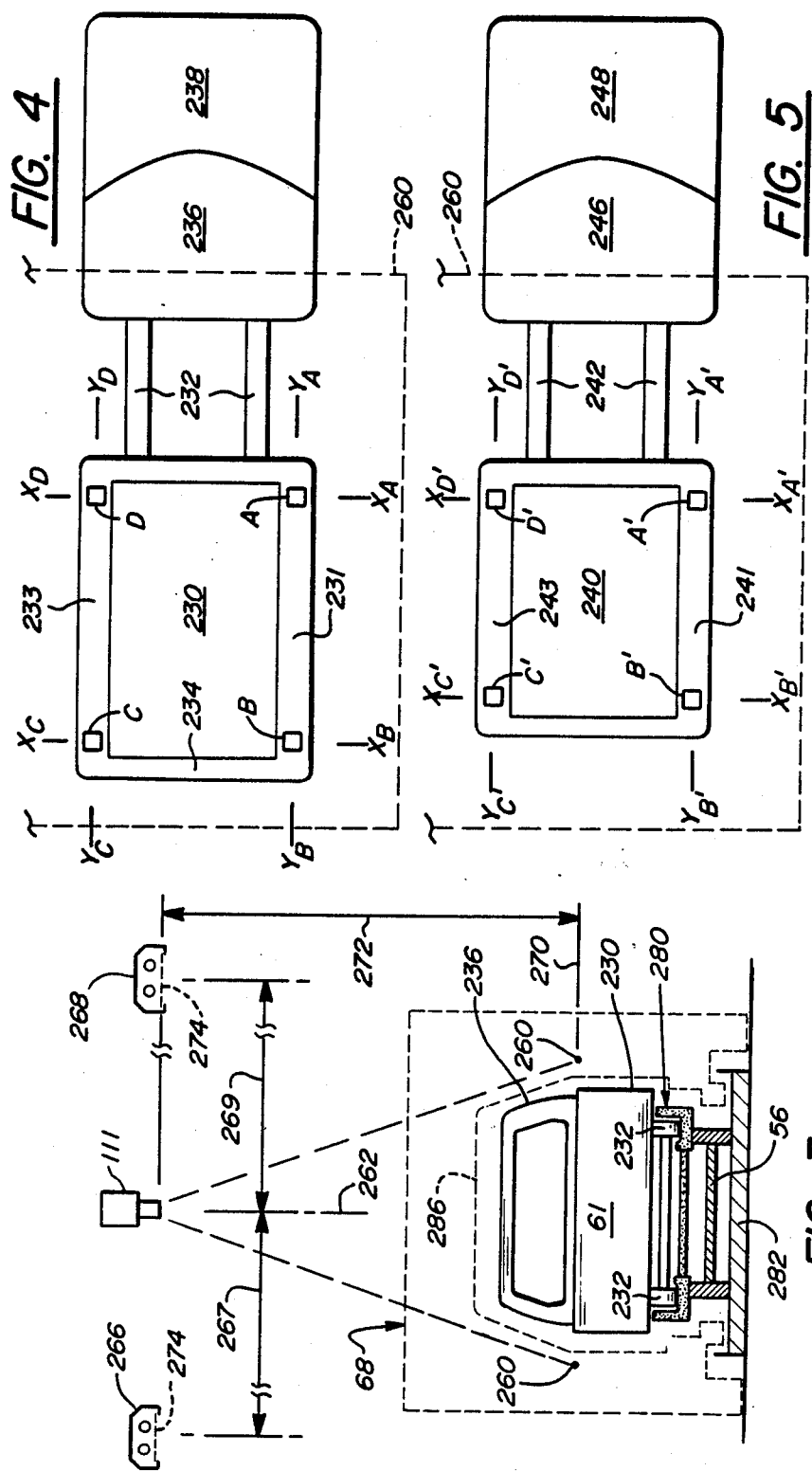

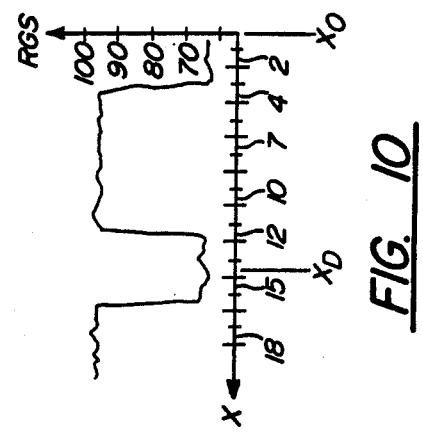
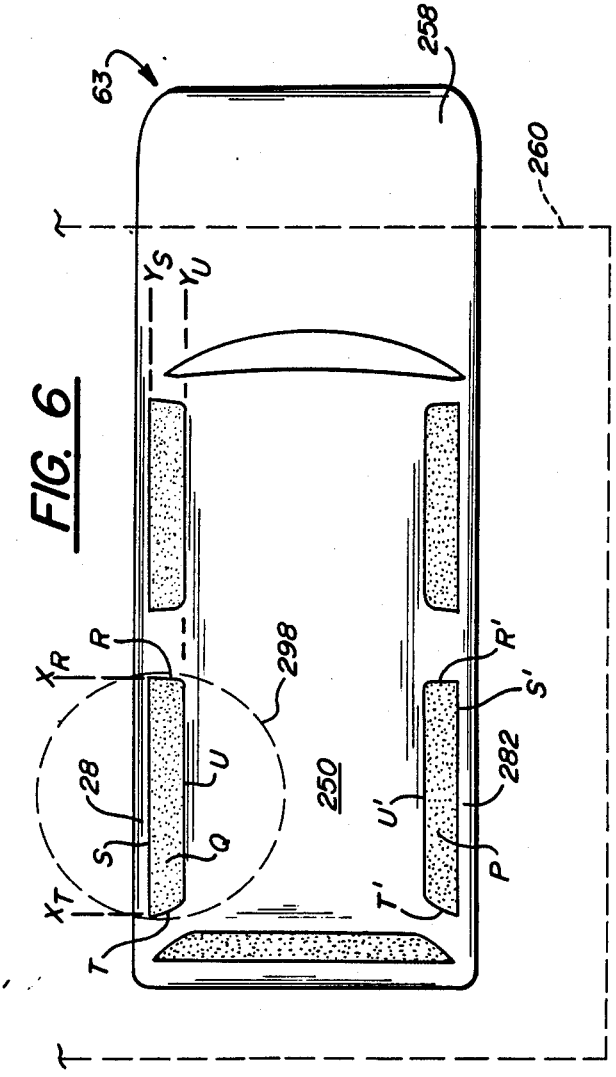

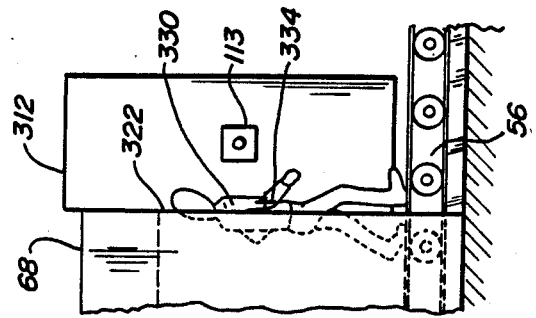
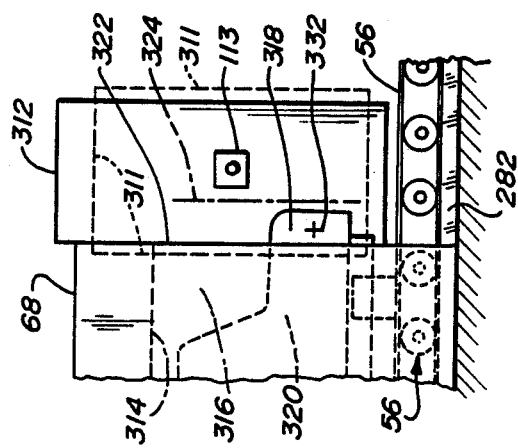
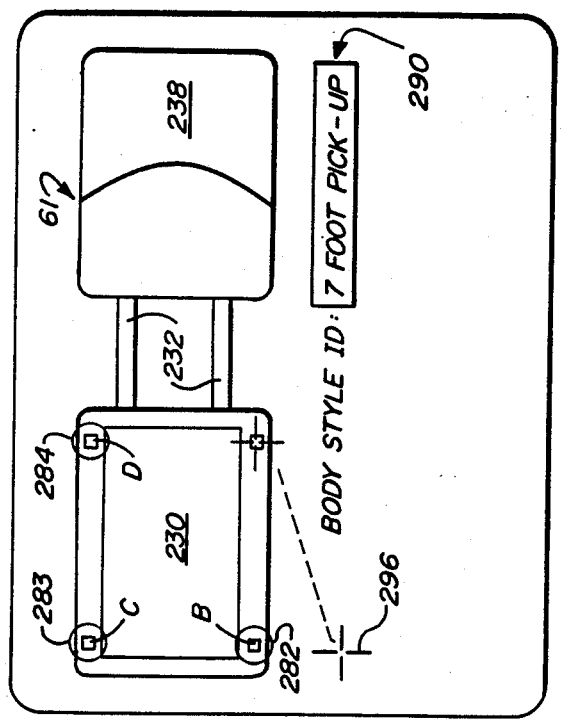

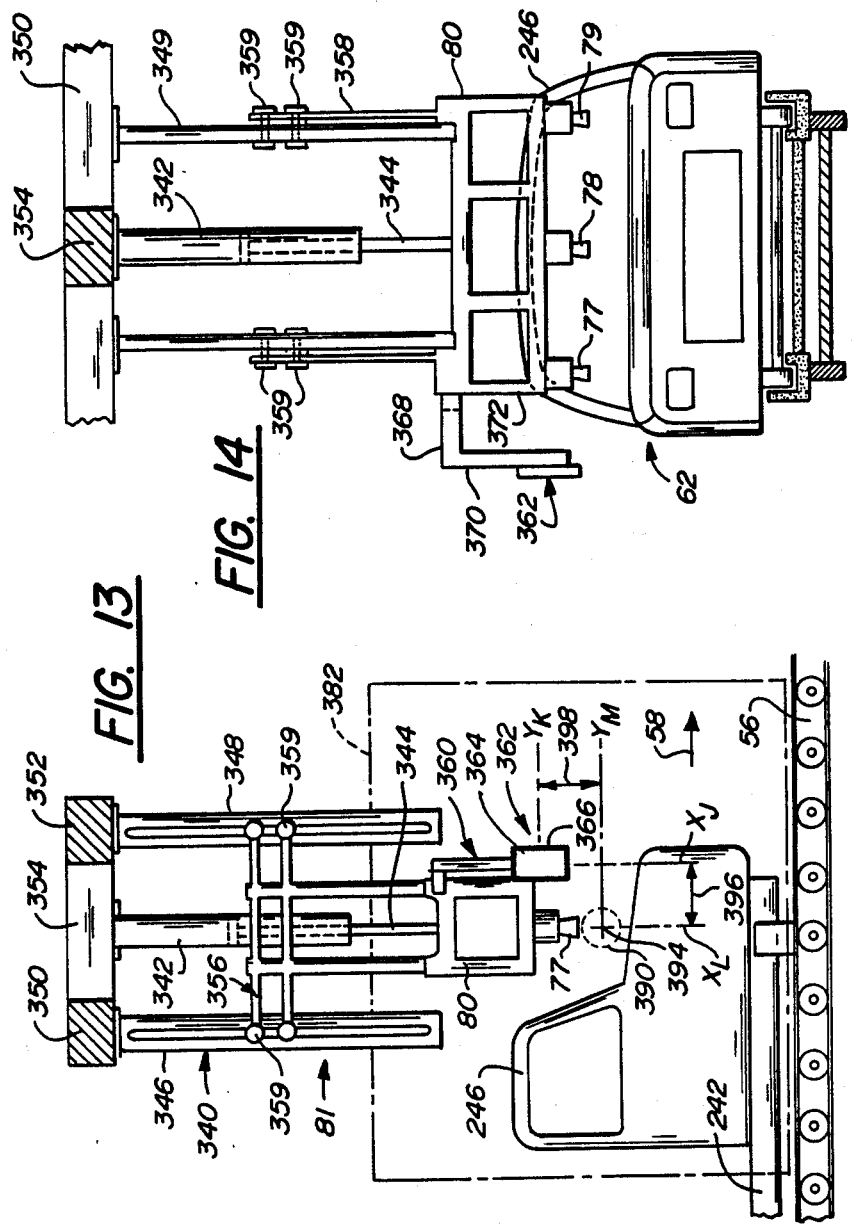

VISION SYSTEM AND METHOD FOR AUTOMATED PAINTING EQUIPMENT

FIELD OF THE INVENTION

This invention relates to machine vision apparatus, image analysis systems and methods for automated painting equipment.

BACKGROUND OF THE INVENTION

In recent years, general purpose machine vision systems utilizing one or more television (TV) cameras and a high-speed digital processing system for image analysis have become available for a variety of image analysis applications. These vision systems typically include a variety of standard hardware and software features to perform various processing steps including image acquisition, feature enhancement, image segmentation, feature extraction and recognition of objects, and features and attributes thereof. The attributes of the objects or features which can be recognized or determined include location with a scene or buffer, area, centroid of the area, and orientation of the object or feature under scrutiny. These general purpose machine vision systems must be adapted and tailored to a specific application before they can serve any useful purpose in an industrial process setting. This is accomplished by proper selection and placement of vision hardware, which includes locating one or more cameras and providing proper lighting and camera filters (if needed), creating an applications software package or program to direct and control the operation of the vision system hardware, and interfacing the vision system to the electronic controllers operating or monitoring the process equipment.

Automated painting equipment, such as paint lines for automotive vehicle bodies and parts found around the world in the factories of automobile and truck manufacturers, presently utilize a significant number of photocell devices to identify objects and conditions so that the equipment may be properly operated in a safe and desired manner. For example, several photocell devices are typically used singly or in combination to automatically identify or verify the type of object approaching a paint spray station or booth within an automated paint line. Photocells are also often used to detect the intrusion of a human being into various zones of the paint line. They are also used to detect the arrival of a vehicle body at a predetermined location within the paint spray station or booth, which thus initiates a "zone start" or similar signal, that causes the applicators to begin spraying paint. As a final example, they are mounted on and move with movable paint bell support fixtures or platforms to ensure that a proper distance or minimum clearance will maintained between the paint bells on the fixture and the object or vehicle body being painted. In electrostatic paint spraying equipment, such nozzles are normally referred to as bells, to distinguish them from the conventional paint spray nozzles which work without the benefit of electrostatic forces upon the paint droplets emanating from the nozzles.

Up until the present invention, the photocell devices have been preferred for object identification, detection and sensing for automated painting equipment. They are preferred because they are non-contact devices which do not scratch the object (i.e., vehicle body or part) to be painted, are relatively reliable if properly maintained, and can be located so as to not interfere with the movement of the objects to be painted through the paint line. Yet, photocell devices have drawbacks. The photocell devices are easily fooled or disabled by mischievous workers or by environmental factors, such as dirt, dust, paint mist or splatter fogging over or otherwise obscuring the transparent protective covers of the photocells. Typically they must be cleaned often, perhaps as often as three times per eight hour work shift, in order to ensure that they will operate properly. Also, the photocell devices are rather expensive, particularly when the custom-designed placement, installation and hook-up costs (such as conduit runs and wiring) are included, with some estimates being as high as $1000.00 per photocell device. The photocell devices, if not critically aligned, often times will not properly identify an object. Moreover, the object to be identified must itself typically be precisely positioned upon its pallet or other holder that is normally carried along by a conveyor system, in order to be properly identified. The photocell devices may well incorrectly identify or not be able to identify an object if the object is slightly out of alignment upon its pallet or holder. Finally, the typical photocell device used on an automotive paint line has been estimated to add approximately one foot to the longitudinal dimension of such paint line, principally on account of the unobstructed, uncluttered space required for a clean or interference-free zone for the line of sight of the photocell beam. Thus, using photocell devices adds materially to the overall size and cost of the paint line.

In order to eliminate most (if not all) of the drawbacks associated with the use of photocells on paint lines and to permit the paint lines to be made physically smaller, I investigated the use of machine vision systems as a replacement or alternative for photocells. My work in this area led to my invention described below which offers numerous advantages over conventional photocell devices and associated methods for detecting and identifying objects and person entering or passing through automated painting equipment such as vehicle body paint lines. My work clearly indicates that machine vision systems with one or more television-type cameras can be used with painting equipment to: (1) replace photocells in many applications on paint lines; (2) increase equipment reliability; (3) reduce maintenance requirements; (4) improve the accuracy of the identification of objects and persons; (5) reduce set-up or change-over costs when objects to be painted having a different configuration (such as a new vehicle body style); (6) increase tolerance to misalignment of the objects to be painted on their work rests; and (7) save a considerable amount of space on the equipment such as a paint line as well, thus allowing more compact (and hence less expensive) paint lines to be constructed.

SUMMARY OF THE INVENTION

In general, my invention relates to use of general purpose machine vision systems and method for identification, monitoring, and control purposes on automated paint equipment such as automotive vehicle body paint line. The objects to be painted by the paint line may include entire vehicle bodies, or vehicle body parts, or automotive components or trim. For the identification of vehicle bodies, body parts, or other components, cameras may be mounted at convenient locations where unique or distinctive visual attributes or features of the various objects to be identified may be seen. For example, a camera may be mounted on or near the ceiling of a paint line and look down upon objects to painted as they are transported into the paint line by a suitable conventional conveyor system. As the objects come into the field of view of such a camera, the machine vision system can process each image received therefrom in a very short period of time, which can be less than 100 milliseconds, and through suitable recognition and comparison steps explained hereinafter, can correctly identify known objects, selected from as one of several choices programmed in the system memory, with extremely high reliability. One advantage which such machine vision systems have over conventional combination of photocell devices whose output signals are interpreted by software resident in programmable controllers is that the machine vision system may be placed in a learn mode, and may taught to recognize a new configuration of an object to be painted, such as a new body style, with a relatively small amount of effort. Once such learning is completed, the machine vision system may be put back into operation and will thereafter recognize the newly learned new body style, as well as previously learned ones.

In a second aspect of my invention, the machine vision system is used on the paint line to provide an intrusion-sensing function in areas where only certain designated objects are expected, and where unwanted or unexpected objects provide cause for concern. For example, near the entrance to the electrostatic paint spray booth of the paint line, a second camera may be mounted to the side of the line and observe the entranceway. The machine vision system can analyze successive images from this camera to determine whether a vehicle, human being, or unknown object is entering the paint booth. When the system determines that a vehicle is entering the paint booth, the system can be set up to produce a "zone start" signal when the vehicle reaches a predetermined location. Such a start signal can be used by a programmable (or other) controller that actually operates the painting equipment to begin the normal painting sequence for the vehicle body. When a human being is detected, the vision system can inform the controller of the paint line to enable the controller to take appropriate action, or avoid action possibly detrimental to the human being in the paint booth. Finally, if the presence of an unknown object (i.e., not a recognized vehicle body, component or a human being) is detected at the entrance of the paint spray booth, the controllers can be so informed so that appropriate measures may be taken.

One important advantage of using a vision system to perform this intrusion-sensing function is that the length of the conventional silhouette tunnel, which is used in conjunction with an array of photocell devices to perform an intrusion-sensing function, may be greatly reduced. Since the vision system is capable of quickly and accurately identifying objects, the silhouette tunnel could be turned into a relatively thin wall having an opening therein slightly larger than, but otherwise corresponding to, the end profile of the vehicle bodies to passed therethrough, thus shortening the paint line by several feet.

A third aspect of the present invention involves the use of a third camera coupled to the machine vision system to monitor the clearance between the object being painted and electrostatic paint spray bells from which the paint emanates, and the platform upon which the bells are mounted. If, for example, the bells in question are part of an adjustable-elevation roof-mounted machine in an electrostatic spray booth which is painting the vehicle body from above, the clearance between the vehicle body and paint spray bells may be determined by a camera placed to one side of the paint spray booth. With appropriate lighting, this camera can observe the paint spray booth. With appropriate lighting, this camera can observe the paint spray bells and the car body in profile, thereby "seeing" the actual gap between the paint spray bell and the closest portion of the vehicle body. As will explained in detail, a vision system processing images received from this camera can determine the approximate distance or amount of clearance between the bells and body, and send one or more appropriate signals to the programmable controller which controls the relative elevation of the roof machine to ensure that appropriate clearances are maintained at all times between the bell and car body. This approach has several advantages over the prior art practice of mounting one or more photocell devices on the roof machine itself so that the beams of light from the photocell devices are broken before the paint spray bell comes too close to the vehicle body being painted. First, the camera monitoring this clearance distance may be mounted away from the roof machine in a much cleaner location, a good distance from the paint spray. Second, it provides far more information about the actual clearances than between the bells and car body one or several photocell devices. Third, it may be used to actively control the spacing being the bells and object being painted, thus optimizing spacing for the best possible painting results.

The foregoing introductory overview of three purposes to which my invention may be put should enable the following summary of the distinguishing features of my vision system to be better understood. According to a first aspect of my invention, there is provided vision apparatus for automated painting equipment, comprising: (a) at least one camera means for acquiring successive images of a first scene from a first portion of the painting equipment including at least a first movable object to be identified via selected pictorial attributes thereof; and (b) an image analysis system for processing successive images received from the camera means. The image analysis system will normally include: (1) means for recognizing selected pictorial attributes of the first object when such attributes are present in at least one of the successive images, (2) means for comparing the recognized attributes of the first object with corresponding reference data from a first set of information previously stored in the system, and (3) means for identifying the first object when a match within a predetermined first tolerance exists between at least one of the recognized pictorial attributes and corresponding reference data from the first set of information. The vision apparatus may further comprise either or both of the following: means for communicating the identification of the first object as being present in the first scene to the automated painting equipment; and means for visually communicating the identification of the first object as being present in the first scene to a human being. The later means may be a two dimensional image display means for displaying at least part of the scene containing the object, such as a cathode ray tube ("CRT"), i.e., a TV-type monitor.

To provide for a zone start signal as described above, the image analysis system of the vision apparatus may further include: means for determining when the first object has moved into the scene sufficiently to have reached a predetermined location within the first scene; and means for sending a signal to the painting equipment when the first object has reached the predetermined location within the first scene. Also, the image analysis system may further include means for recognizing the entry of a human being into the first scene.

To provide for monitoring of the clearance between the paint bell and vehicle body, as described above, the vision apparatus needs the ability to identify a second movable object in the first scene by selected pictorial attributes of the second object. For this purpose, the image analysis system may further include: means for recognizing selected pictorial attributes of the second object when such attributes are present in at least one of the successive images at the same time selected attributes of the first object are present therein; and means for comparing the recognized attributes of the second object with corresponding reference data from a second set of information about the second object previously stored in the system; and means for identifying the second object as being present in the first scene when a match within a predetermined second tolerance exists between at least one of the recognized attributes of the second object and corresponding reference data from the second set of information.

According to another aspect of the present invention, there is provided a method of using a machine vision system in connection with the operation of automatic painting equipment, comprising the steps of: (a) acquiring, through the use of at least one camera means, successive images of a first scene associated with at least a first portion of the automated painting equipment, the first scene from time to time included therein at least a first movable object having selected pictorial attributes; and (b) processing successive images received from the camera means using an image analysis system. The processing of Step (b) is preferably done by: (1) recognizing selected pictorial attributes of the first object within the first scene; (2) comparing the recognized attributes of the first object with corresponding reference data from a first set of information previously stored in the image analysis system; (3) identifying the first object as being present in the scene when a match within a first predetermined tolerance exists between at least one of the recognized attributes and the corresponding reference data from the first set of information. The foregoing method preferably also includes a task definition procedure which is performed before either Steps (a) or (b) above. This task definition procedure comprises the steps of: (c) acquiring an image of a typical first object to be identified; (d) placing the image analysis system in a learn mode; and (e) instructing the image analysis system as to which of the pictorial attributes of the first object are to be stored as part of the first set of information for use during Step (b).

These and other aspects, objects and advantages of the present invention will be more fully understood by reference to the following detailed description taken in conjunction with the various figures and appended claims.

BRIEF DESCRIPTION OF THE DRAWINGS

The drawings from an integral part of the description of the preferred embodiments and are to read in conjunction therewith. Identical reference numerals designate like components in the different figures, where:

FIG. 2 is a block diagram of a preferred embodiment of the machine vision system hardware used in FIG. 1;

FIG. 3 is an end elevational view of the front portion of the FIG. 1 paint line taken along line 3—3 of FIG. 1 showing the overhead camera used to identify each vehicle transported by a conveyor system through the paint line;

FIG. 4 is a simplified plan view of a first truck body, namely a pick-up truck body with a seven-foot-long bed, which shows the four post holes in the truck body to be observed by the camera in FIG. 3, as well as the general outline of the truck body;

FIG. 5 is a simplified plan view of a second truck body, namely a pick-up truck body with a six-foot-long bed, which shows the four post holes in the truck body to be observed by the camera in FIG. 3, as well as the general outline of the truck body;

FIGS. 6 and 7 are simplified plan and side views respectively of a third truck body, namely a square-back truck body, which shows the two side-door windows to be observed by the camera in FIG. 3, as well as the general outline of the truck body;

FIG. 8 is a simplified front view of the screen of a CRT display showing a simplified plan view image of the seven foot pick-up truck of FIG. 4, with graphical symbols and words added to the image by the machine vision system of the present invention;

FIG. 9 is an enlarged fragmentary top view showing one of the post holes of the seven foot pick-up truck body shown in FIG. 4;

FIG. 10 is a graph showing the raw gray scale ("RGS") level of the pixels along the X axis at a selected Y axis elevation of FIG. 9, which shows the abrupt decrease in gray scale level within the post hole;

FIG. 11 is a simplified, fragmentary side elevational view of the FIG. 1 paint line showing the front end of a truck body emerging from the silhouette tunnel of the paint line, which generally corresponds to the area indicated by line 11—11 in FIG. 1, about the field of view of the second camera;

FIG. 12 is a side elevational view of the same area depicted in FIG. 11, but showing a human being emerging from the silhouette tunnel;

FIG. 13 is a simplified, fragmentary side elevational view of the FIG. 1 paint line taken along line 13—13 showing the roof machine within the paint spray booth in position to paint the hood of a pick-up truck body;

FIG. 14 is an end elevational view taking along line 14—14 of FIG. 1 showing the roof machine and pick-up truck body in the same position as in FIG. 13;

DETAILED DESCRIPTION OF THE PREFERRED EMBODIMENTS

A. The Paint Line

Figure 1:
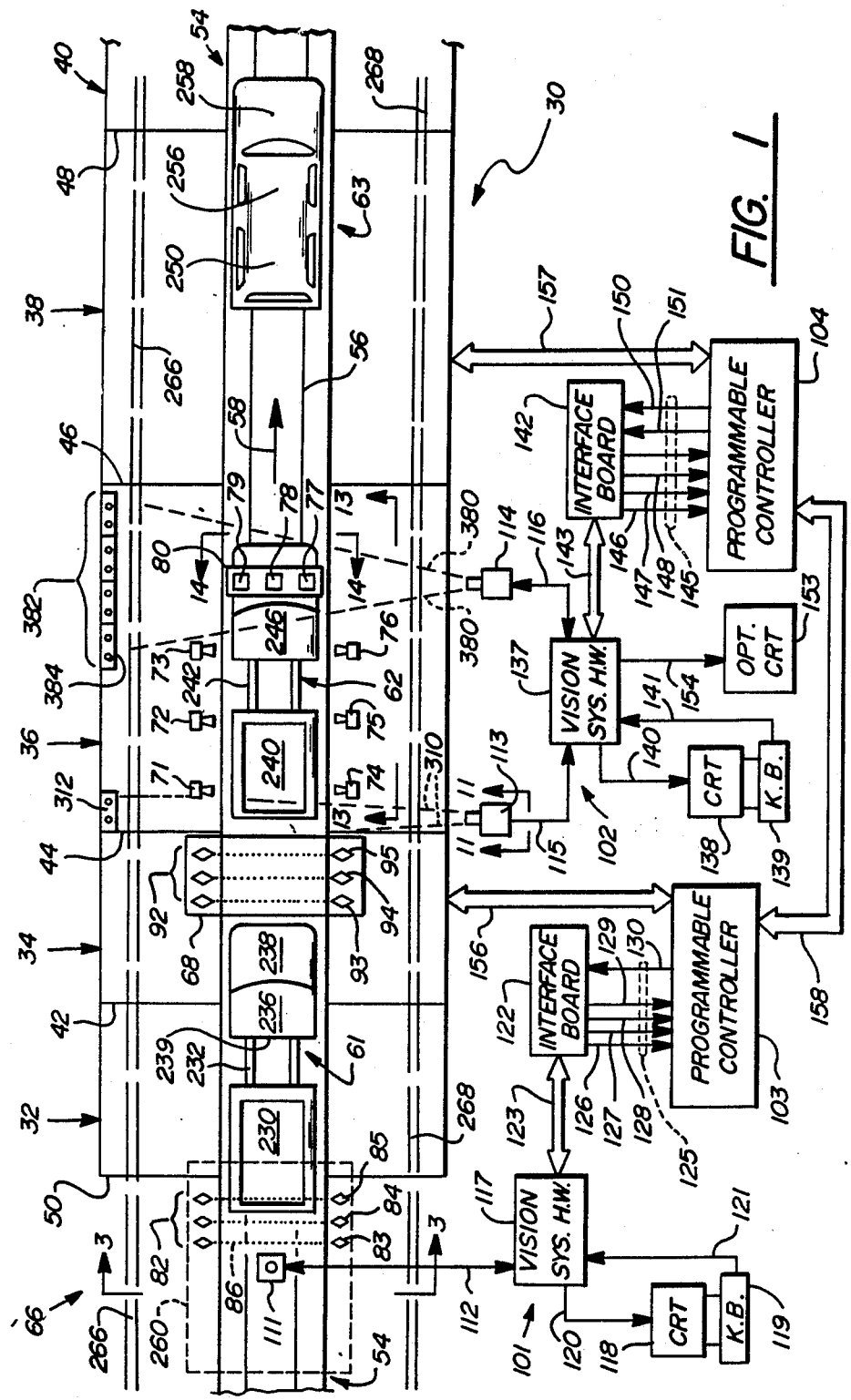
FIG. 1 is a combination drawing including a simplified plan view of a portion of an automotive body paint line which shows the general location of three TV cameras and includes an electrostatic paint spray booth, and a block diagram for two machine vision systems and two electronic controllers for the paint line.

Referring now to FIG. 1 there is shown a plan view of automated painting equipment, namely a portion of an automotive vehicle body paint line 30, which includes five substantially enclosed bays or sections 32, 34, 36, 38 and 40 separated by interior walls 42, 44, 46 and 48 and an entrance 50. The paint line 30 may be of any conventional design and construction familiar to those in the automotive vehicle body and vehicle parts and accessories painting industry. Such a paint line 30 typically has a conveyor system 54 extending therethrough provided with a belt conveyor 56 or the like which moves through the central longitudinal area of the paint line 30 in one direction such as is indicated by arrow 58 to transport vehicle bodies having a plurality of different body styles, such as bodies 61, 62 and 63, therethrough. The various vehicle bodies are typically supported upon pallets which ride upon the belt conveyor 56 in known manner so that the pallets and vehicle bodies thereon can be stopped if desired by blocking movement of the pallet with a mechanical stop or dog while the conveyor continues to move. When the conveyor 56 is moving and a pallet is not mechanically stopped, the pallet will move at the exact same speed as the conveyor 56.

An open (i.e., non-enclosed) vehicle identification (ID) section or area 66 preceding section 32 of the paint line 30 also forms part of the paint line. At vehicle ID section 66 vehicle bodies being transported by the conveyor are temporarily stopped so that the vehicle body style may be positively identified as will be shortly explained. The sections 32–40 and 66 of the paint line 30 are not necessarily shown to scale. Each section is dedicated to performing a different function. For example, in section 32, automatic dusting equipment (not shown) such as conventional feather dusters may be positioned to clean off any dust or other fine particles which may be present on the vehicle bodies. If desired, section 32 may be enlarged and room provided for workers with tack cloth to further clean the vehicle bodies that are to be painted. The next section 34 of the paint line 30 may be a manual (or automated) spray area where persons (or robots) armed with compressed-air-powered paint spray wands and the like paint difficult-to-reach areas of the vehicle. Shown as part of section 34 is a conventional silhouette tunnel 68 through which the vehicle bodies must pass in order to enter section 36, which is an electrostatic paint spray booth. Within the booth 36 are shown nine paint spray bells 71 through 79. Side bells 71–73 paint the outer left side of the vehicles, while side bells 74–76 paint the outer right side of the vehicles. Bells 77–79 are located on a movable platform 80 which is part of a ceiling-mounted roof machine 81 (not shown in FIG. 1) and which may be lowered and raised as necessary to provide the proper clearance between the vehicle. (The platform 80 itself is sometimes referred to as the "roof machine".) The paint spray bells 71 through 79 typically turn on and off under a timed sequence which is synchronized with movement of the belt conveyor 56, and therefore with the movement of each vehicle body, through the paint spray booth 36 in a manner well understood by those in the art.

Section 38 of paint line 30 may be used if desired for automatic reciprocating paint spray equipment or for a second manual paint spray operation. Similarly, section 40 of the paint spray line 30 may be used for any conventional purpose such as paint drying equipment.

In a conventional paint spray line, various groups of photocell devices may be used for the several purposes described above in the background portion of this specification. A few such photocell installations are illustrated in FIG. 1 for comparison purposes. For example, a group 82 of three photocell devices 83, 84 and 85, each having a beam (such as beam 86 represented by a dotted line) which projects across the conveyor system 54 might be used to identify or verify the vehicle body style on a pallet of the conveyor 56 as it passes through section 66 prior to entering dusting section 32. Similarly a second group 92 of three photocells 93–95 may be located within the silhouette tunnel 68 to detect the presence of a vehicle body or human being, and if a vehicle body is detected, cause a zone start signal to be produced at the appropriate time in order to synchronize the sequence of operation of the paint bells 71–79 and roof machine 80 with the movement of the vehicle body through the electrostatic paint spray booth 36. Finally, a third group of photocell devices (not shown) can be mounted just below and move with bells 77–79 so as to project a pair of beams transversely to arrow 58, one beam in front of and one beam in back of the bells 77–79, to make sure the bells are not getting too close to the object they are painting. The present invention renders the need to use the groups 82 and 92 of photocell devices, and the photocell devices on the roof machine 80 unnecessary, since machine vision systems with suitable cameras can perform these same functions, with ease, reliability and accuracy.

B. Vision System Hardware and General Software

The lower half of FIG. 1 shows a very simplified block diagram of two vision systems 101 and 102 interconnected respectively to two programmable controllers 103 and 104 which operate the paint line 30. Vision system 101 is connected to a first camera means 111 by an appropriate cable 112. Vision system 102 is connected to two cameras 113 and 114 by cables 115 and 116. The lenses of cameras 111, 113 and 114 may be provided with polarizing filters to cut down on glare. Each camera cable typically includes at least one wire for a sync signal from the vision system, and one or more wires for the video signal from the camera. The vision system 101 includes vision system hardware 117, which will be further described with respect to FIG. 2, and a two dimensional image display means such as a CRT 118 and keyboard input means 119 connected by cables 120 and 121. The first vision system 101 also includes a signal-conditioning buffer unit 122 (hereinafter interface board) interconnected to hardware 117 by a databus 123 to facilitate communication through various conventional signal paths 125 which may include discrete signal cables 126–128 carrying signals from the interface board 122 to the programmable controller 103, and signal cables such as 130 carrying signals from the controller 103 to vision system 101.

The second vision system 102 similarly includes vision system hardware 137, a CRT 138 and keyboard 139 connected by cables 140 and 141. The system 102 also includes an interface board 142 to facilitate communication along signal path 145 between the vision system 102 and programmable controller 104, including signal paths 146 through 149 carrying discrete signals from system 102 to controller 104 and signal paths 150 and 151 for carrying signals from controller 104 to system 102.

The programmable controllers 103 and 104 may be programmed in conventional fashion to control the operation of the paint line 30. The broad arrows 156 and 157 represent the many wiring interconnections between the input/output channels of each programmable controller and the input devices (not shown) such as limit switches, photocell devices, pushbuttons, selector switches and the like, and output devices (not shown) such as solenoids (to operate hydraulic, pneumatic, paint, and solvent valves), motor starters, pilot lights, audio alarms and the like used with the paint line 30. Broad arrow 158 represents interlocks and communications between controllers 103 and 104.

The vision system 102 also is shown with an optional CRT 153 connected to hardware 137 by cable 154. One or more optional CRTs may be provided to allow the operation of the cameras 113 and 114 (or 111) associated with vision system 103 (or 101) to be monitored in different places by human operators attending the paint line 30 when the line 30 is running.

FIG. 2 is a block diagram of a preferred embodiment of the vision system hardware 117 (or 118) for vision system 101 (or 102), which for convenience may be called the image analysis hardware system 170. The hardware illustrated in FIG. 2 may be purchased from the International Robomation/Intelligence Company ("IRI") of Carlsbad, California. The system 170 corresponds to two models of vision systems provided by that company, namely the PX/VR vision system and the DX/VR vision system. Each model is a stand-alone gray scale image system of extended, high performance and high variable resolution. The model PX/VR is a production system specifically designed for industrial real-time applications. Color graphics is a standard feature of both of the models, and each model system includes up to eight camera inputs, RGB color outputs and bit-mapped graphics. The DX/VR model is a UNIX-based multi-user program development workstation that contains the hardware resources (including memory management and 40 Mbyte Winchester disk) needed to run a UNIX-like operating system. Each of these models will support a high resolution option ("HRO") that allows image acquisition resolution (i.e., camera resolution) and an image processing resolution of 1024 by 1024, 512 by 512 or 256 by 256 pixels. In my two prototype vision systems of the present invention, I found it unnecessary to use the high resolution features of either of these IRI vision systems, since the distinguishing features of the objects within the scenes being examined could be discerned quite satisfactorily with a camera resolution of 256 by 256 pixels. Nevertheless, those in the art should appreciate that the high resolution option of the variable resolution vision system shown in FIG. 2 could readily be adapted to the present invention should higher resolution images be required for accuracy or to be able to discern smaller features sizes.

The system 170 includes a camera interface/digitizer 172, an image input buffer and CRT controller 174, a systolic array-based copy processor 176, a processing buffer and CRT controller 178, a group 180 of dedicated "iconic" (i.e. low-level image) processors, an optional multi-functional array processor 182, a host computer 184, a direct memory access ("DMA") bus 186, a system bus 188, a VME bus communications interface 190 for communicating with VME bus 192 to which other independent computer systems may be connected, one or more 5 and ¼ inch floppy disks drives 194, a larger hard disk drive 196 (such as a 40 Mbyte Winchester disk drive), and an optional memory controller 198 (to accommodate additional memory if needed) all interconnected generally as shown. The processing buffer portion of block 178 includes four frame buffers, each having a size of 256×256 pixels. Without HRO, the PX/VR and DX/VR machine vision systems from IRI will accept up to 8 RS170 standard TV camera inputs, which may be either black or white ("B/W") or color. In the prototype systems of the present invention, B/W camera signals were found to produce satisfactory results, even though the vehicle bodies were being painted with one (or two) of 36 widely different colors, including white, silver, dark blue and black. Without HRO, the resolution offered for each camera is 256 by 256 pixels, with 256 raw gray scale ("RGS") levels. After the B/W TV signals input along signal path 200 has been conditioned and appropriately digitized into one 8 bit byte per pixel by camera interface/digitizer 172, the signals are passed along through data path 202 to the image input buffer and CRT controller 174 which has 1 Mbyte of random access memory. The buffer 174 can be accessed at a sequential addressing rate of 40 million pixels per second or a random address rate of 12.5 million pixels per second. The copy processor 176 can transfer information from the image buffer 174 to the DMA bus 186 at the rate of up to 12.5 million pixels per second. Block 174 also includes a CRT controller which can directly output the contents of the image buffer in block 174 to any CRT monitor via data path 204.

The host computer 184 may be constructed around a Motorola MC86010 processor with no-wait states and a 12 MHz clock speed. The processor of computer 184 addresses a 512 K byte random access memory and an optional 128 Kbyte erasable programmable read only memory (EPROM). The DMA bus 186 and its associated controller is part of computer 184 and is implemented using a Motorola MC68450 four-channel DMA package. The computer 184 also includes four RS232 (or RS422) ports indicated by lines 208 for serial I/O communications, and a 16 bit parallel I/O port indicated by data path 210. A second parallel I/O (Centronics) port indicated by data path 212 is available as a printer port, but may be used for discrete parallel I/O communications if so desired, as has been done in the prototype systems 101 and 102 of the present invention.

The image analysis system 170 is characterized by a multiprocessor architecture wherein the various processors are able to communicate via the system bus 188, as well through certain other designated data paths such as paths 214 through 218. The hierarchy of steps undertaken in the image analysis process are typically distributed over the hierarchy of dedicated processors 176, 180, 182 and 184 so as to be efficiently matched to the image analysis task to be performed. Specifically, the host computer 184 which includes a vary fast virtual memory management unit, is supported in its tasks by the special coprocessors 176, 182 for various image preprocessing and feature extraction functions. The high-speed array processor 182 is optional, and is used for feature enhancement, image segmentation, and feature extraction operations. It is a highly piped-lined array which operates in single instruction-multiple data (SIMD) mode. The host computer 184 is capable of performing up to one million instructions per second (MIPS); the array processor can perform up to 50 million arithmetic operations per second (MOPS).

The dedicated iconic processor 180 provides additional high-performance hardware feature extraction functions with the ability to isolate a rectangular window of variable dimensions within a 256 by 256 pixel image. Within the selected window, the following functions can be performed: monadic point transformations, and row, column, or diagonal histogram or profile calculations. By monadic point transformations are meant any arbitrary linear or non-linear function involving one variable, such as image inversion, a single-level conversion, single-level thresholding, multi-level thresholding, suppressing certain ranges of gray scale; histogram equalization for contrast enhancement, and the like. In addition the processing buffer 178 and iconic processors 180 via image buffer read path 216 and read/modify/write data path 218 can perform the usual reads/modify/write cycle functions. These typically are "translate-and-copy" functions executed upon command from the host computer 184, wherein an image from within one of the 256 by 256 frame buffers in processing buffer 178 is translated according to some transformation function by the processor block 180 and then the translated image is copied into the same or another frame buffer within processing buffer 178.

The PX/VR system runs under an IRI operating system known as RT/M using one or more application programs developed in the FORTH language (on the IRI PX/VR system or the IRI model P256 vision system) or in the language "C" (on the DX/VR system or on the IRI model D256 vision system equipped with a UNIX-based program development facility). Application programs developed on the DX/VR or D256 vision systems can be down loaded via the RS232 communications facility or a floppy disk to the PX/VR vision system, and executed in real-time by the RT/M operating system. RT/M includes facilities for interrupt handling and event-driven execution, file management, an interactive execution of a very comprehensive image analysis function (software) library known as the "iconic kernel system" (IKS). The model DX/VR vision system runs under a REGULUS operating system which is compatible with UNIX operating systems and provides a UNIX-like user interface. (REGULUS is a software product and trademark of Alcyon, Inc., while UNIX is a software product and trademark of AT&T Bell Laboratories.) Application programs developed on the DX/VR vision system can be executed on the DX/VR vision system or on the PX/VR vision system. The specifics of the operation of the vision system 170 hardware, system software and image analysis function library in FIG. 2 is well documented in existing IRI system, hardware and software manuals and literature, including the following, which are hereby incorporated by reference:

(1) *A Primer on Machine Vision and the IRI Vision Systems*, (1985);
(2) *RT/M Reference Manual, Release* 2.1 (Mar. 1986);
(3) *Regulus 4.2D D256 Reference Manual Supplement* (Aug. 1986);
(4) *IKS Manual* (Jan. 1987);
(5) *D256 and DX/VR Reference Manual* (Dec. 1986);
(6) *PX/VR Technical Manual* (1986); and
(7) *Preliminary Product Bulletins (Undated) for PX/VR Variable Resolution System and for DX/VR Variable Resolution System*.

Accordingly, further description of the general IRI vision systems, such as system 170, need not be given here. Moreover, those skilled in the art of machine vision systems are well aware of how to program and how to use most image processes or analysis functions available in a vision system library such IKS. Therefore, a detailed explanation of applications programming and machine vision image processing functions need not be given herein.

C. The Three Vehicle Body Styles and Identification Thereof

Returning to FIG. 1, it can seen that the three truck bodies 61, 62 and 63 are three different styles of vehicles. Truck body 61 is a pick-up truck having a seven-foot-long bed 230, chassis 232, a cab section 236 and hood section 238. The chassis 232 is partly visible because the truck bed 230 is temporarily installed backwards upon the chassis 232 and spaced apart from the cab section 236 by about three feet for the painting operation. This allows the rear wall 239 of the cab to be more easily painted than if the bed were placed up close against the cab section 236.

The second truck vehicle body 62 has a bed 240 which is six feet long, a chassis 242 and a cab section 246 and hood 248. Like truck body 61, the bed 240 is rotated 180 degrees from its normal position and separated from the cab 246 by about three feet. The third truck body 63 shown in FIG. 1 is a square-back body style having a rear passenger section 250, a front passenger section 256 and a hood section 258.

The first camera 111 in FIG. 1 scans a rectangular area 260 (shown in dotted lines) within vehicle ID section 66 in order to identify the style of truck body when each truck body to be painted by line 30 is temporarily stopped within rectangle 260 for this purpose. FIG. 3 taken along line 3—3 of FIG. 1 shows an end view of the entrance 50 to the paint line 30, and shows the position of overhead camera 111 centered high above the belt conveyor 56 on vertical center line 262. As shown in FIGS. 1 and 3, lighting for the scene viewed by camera 111 is provided by two conventional fluorescent fixture arrays 266 and 268 which run the length of paint line 30 approximately 14 to 15 feet above the floor line 270, and are approximately 10 feet on either side of center line 262 as indicated by horizontal dimension lines 267 and 269. The camera 111 is mounted approximately 10 feet above the top plane 270 of the bed 230 (or 240) of the pick-up truck body 61 (or 62) as indicated by vertical dimension line 272. Each fixture array 266 and 268 consists of a series of eight-foot twin-bulb fluorescent fixtures arranged end-to-end. The fluorescent light fixtures of arrays 266 and 268 may be provided with conventional, translucent cover plates 274 to help diffuse (i.e., evenly spread) the light upon the objects being inspected by the camera 111.

The chassis 232 of truck body 61 is supported by a suitable pallet structure 280 which rides on top of and is frictionally or otherwise releasably engaged by belt conveyor 56 in a conventional manner. Grating structure 282 provided beneath the belt conveyor 56 provides a convenient means for containing paint overspray, solvents, cleaning fluids and the like used by paint line 30.

In FIG. 3, the profile of silhouette tunnel 68 is shown in dotted lines. The tunnel 68 is typically used to provide a profile gate through which only a vehicle body or a human being, but not both, may pass. This helps ensure that no one is in paint booth section 36 while it is painting a vehicle body. The inner dotted line 286 conforms to the end profile of the truck bodies 61 through 63 for this purpose. As shown in FIG. 1, conventional paint lines use a group 92 of photocells scanning their beams across the tunnel opening, as indicated by photocell devices 93–95 in FIG. 1 to determine whether a vehicle body, human being or unidentified object is passing through the silhouette tunnel 68. A conventional silhouette tunnel may be up to nine feet long, and will be further discussed with respect to FIGS. 11 and 12 later.

FIGS. 4 through 7 provide more detailed views of the three different types of truck bodies 61–63 shown in FIG. 1, and illustrate the features or pictorial attributes of the vehicle bodies which the vision system 101 connected to camera 111 examines in order to recognize and identify the different styles of truck bodies 61–63. FIG. 4 is simplified plan view of truck body 61 in position within field-of-view rectangle 260 for identification by vision system 101 through an image received from camera 111. The pictorial attributes of the seven foot pick-up truck 61 which the system 101 looks for in the images are the four small rectangular post holes A, B, C and D located near the four corners of the pick-up truck bed 230 in the right and left side walls 231 and 233 thereof. (In the prototype systems of the present invention, body 61 corresponds to a 1987 model year Ford Ranger pick-up truck with a long bed made by the Ford Motor Company.) Specifically, the machine vision system looks for the presence of these four holes at certain pixel locations within the image, and checks their size as well, as will be further explained. It should be noted that the 256 by 256 pixel image lends itself to defining locations in terms of a rectangular or Cartesian coordinate system, with the X and Y axes being the horizontal and vertical axes, respectively. Thus, the center of posthole A can be described as being at pixel location ($X_A$, $Y_A$); the center of posthole B is at location ($X_B$, $Y_B$), and so on.

FIG. 5 is a plan view of the six-foot pick-up truck body 62 which also has four postholes A', B', C' and D' located near the corners of truck bed 240 the right and left side walls 241 and 243. (In the prototype systems of present invention, body 62 corresponds to a 1987 model Ford Ranger pick-up truck with a short bed made by the Ford Motor Company.) It is these four postholes which the vision system 101 via the images from camera 111 recognizes and relies upon to identify and distinguish body 62 from bodies 61 and 63. As in FIG. 4, the location of the centers of the various postholes A'–D' can be specified by Cartesian coordinates, such as ($X_C'$, $Y_C'$). When truck body 62 is brought into vehicle ID section 66 of the paint line 30 by belt conveyor 56, a hydraulically-actuated mechanical stop (not shown in FIG. 1) causes the truck body 62 to stop in the same basic location as truck body 61. Note that the only difference as far as the vision system 101 is concerned, between the two vehicle bodies 61 and 62 is the length of the bed sections 230 and 240, and the difference in the longitudinal location of postholes B, C versus postholes B', C'. (The size and relative location of postholes A–D in comparison to postholes A'–D', such as the transverse spacing between holes A' and D' and A' and D', and between holes B and C and holes B' and C', are substantially identical.) Accordingly, the vision system 101 distinguishes between truck bodies 61 and 62 by taking notice of the relative difference in the longitudinal location or displacement of holes B and C of body 61 in comparison to that of holes B' and C' of body 62.

FIGS. 6 and 7 are a plan view and a side view respectively of the third vehicle body, namely body 63, which is a square-back design. (In the prototype systems of the present invention, body 63 corresponds to the 1987 model year Ford Bronco truck made by the Ford Motor Company.) Vision system 111 of FIG. 1 recognizes the body 63 by examination of two features, namely the rearward side window openings Q and P respectively located in the left side wall 280 and right side wall 282 of the rear passenger section 250 of the body 63. The passenger side wall 282 with a substantially rectangular window opening P is shown in FIG. 7 along with the passenger door 284, which has a somewhat smaller window opening 286 located in it. From overhead camera 111, the window openings Q and P appear generally as an elongated rectangle as best shown in FIG. 6. From this perspective, window opening Q has two short edges, namely front side R and rear side T, and two long edges, namely lower outside edge S and upper inside edge U. Similarly window opening P has two short side edges, R' and T', and two long edges S' and U'. As in FIGS. 4 and 5, it is possible to define the approximate location of the edges R–U and R'–U' in terms of a Cartesian coordinate system corresponding to the rectangular format of the 256 by 256 pixel image received by vision system 111 from camera 101. Specifically, the short edges R and T lie generally along one or a few adjacent vertical columns of pixels crossing the horizontal axis at $X_R$ and $X_T$ respectively. Similarly, the longer edges S and Q are centered about horizontal rows of pixels crossing the vertical axis at $Y_S$ and $Y_U$. The vision system 101 recognizes window openings Q and P by their relative location within the field-of-view or image area 260 and by ascertaining that the two windows have approximately the correct amount of area expected for the window openings, as will be further explained.

FIG. 8 is a front view of a CRT display showing an image of the seven-foot pick-up truck body 61 as displayed by vision system 101 upon monitor 118 for the benefit of a human operator or observer. When the vision system 101 has recognized a feature it is looking for such as holes B, C and D, it indicates this by a suitable graphical symbol surrounding each hole, such as circles 287–289 centered about the identified features. Any suitable symbol (such as oval, rectangle, triangle and the like) or visual effect (such as video reverse, blinking video highlighting, change of color, color contrast or the like) could be used instead of a circle. Once the final feature, namely hole A in FIG. 8 has been recognized, and all appropriate or desired checks have been preformed based upon the information related to the recognized features, the system 111 may indicate to the human operator visually, if desired, that the vehicle body whose image is being captured by camera 111 has been positively identified as a particular style of vehicle body. The system 101 may indicate this by overlaying or displaying a message such as message 290 which reads "BODY STYLE ID: 7 FOOT PICK-UP" to indicate to the operator precisely what body style has been identified. Also, the vision system 101 can send an appropriate signal via data path 123 to interface board 122, which in turn produces an output signal on one of its output lines such as line 126 to notify the programmable controller 103 that the body in scene 260 is the first body style, namely a seven-foot pick-up truck. In a similar manner, the vision system 101 can cause the interface board 122 to generate output signals on lines 127, 128 and 129 which indicate respectively that a six-foot pick-up truck body, a square-back truck body, and an unidentifiable vehicle body is in position within rectangular area 260. The interaction between programmable controller 103 and vision system 101 can be synchronized by suitable input signals sent from programmable controller 103 via input lines, such as line 130 going to the interface board 122, which can pass such synchronizing signals along data path 123 to vision system 101.

FIG. 9 is an enlarged plan view of hole D in FIG. 4. The speckling in areas 292 and 293 outside and inside of the side and front walls 233 and 235 respectively of the bed 230, as well as the speckling within the hole D itself, is intended to show that areas 292 and 293 and hole D are considerably darker than the upper surface of side walls 233 and 235. FIG. 10 illustrates this change in optical density in a graph of the raw gray scale (RGS) level of pixels in a horizontal direction from right to left at elevation $Y_D$ taken by a B/W camera 111. Specifically, the X axis of FIG. 10 represents individual pixels, while the RGS levels on the Y axis of FIG. 10 represent optical density on an absolute scale ranging from a zero (corresponding to completely black) to 255 (corresponding to the brightest all-white intensity). These 256 levels of gray scale are expressed as in binary form using an 8-bit byte. For the lighting conditions described above with respect to FIGS. 1 and 3, the light level on top plane 270 of a typical truck bed being examined by TV camera 111 in the prototypes of the present invention has a gray scale level (as perceived by vision system 101) of between about 50 and about 110. FIG. 10 shows that gray scale level for pixels 1–3 and 13–15 range between 60 and 70, which corresponds to the darker speckled areas 290 and hole D. In contrast, the brighter areas on top of the side walls 233 and 235 of bed 230 have a gray scale level of between 90 and 100, as indicated for pixels 5–11 and 17–19 in FIG. 10. Pixels 4, 12 and 17 are pixels where the gray scale is in transition between the lower levels and the brighter levels.

As shown in FIGS. 4, 5 and 9, the holes A–D and A'–D' are each substantially square. As shown in FIG. 9, the approximate size of the hole, as perceived by camera 111, is approximately three pixels by three pixels, for an area of nine pixels. The vision system 101 may be programmable to recognize each of the holes by looking for an appropriate pattern of light-to-dark-to-light transitions as shown in FIG. 10 in the three rows and columns about the centerline for each holes. For example, the centerlines for hole D shown in FIGS. 4 and 9 is defined by the Cartesian coordinate pair $X_D$, $Y_D$. Since the truck bodies 61 and 62 are carried by a pallet containing suitable locating fixtures which position the truck with fairly good precision, it is possible to specify in advance the local region or neighborhoods of pixels which should be searched to determine whether the holes A–D or the holes A'–D' are present. Specifically, it is only necessary to examine a relatively small portion, well under 15%, of the total number of pixels from an image taken by camera 111 in order to determine whether the vehicle body currently being examined is either a body style like body 61, body 62 or body 63. Since the expected centerlines for each of the holes in known, the vision system 101 can be programmed to examine only a small number of pixels centered about the expected center coordinates of each hole. For example, in order to find hole D, the system could be programmed to examine a 20 by 20 pixel area centered about Cartesian coordinates $X_D$, $Y_D$, or 400 pixels. To look for all four holes of truck bed 230 would thus require examining only 600 pixels (=4×400 pixels) out of 65,536 pixels in the image (256×256=65,536). In the prototype of the present invention, I have determined that an accuracy of no more than plus or minus 5 pixels about the centerlines of each of the holes A–D and A'–D' is sufficient to properly locate and identify them if they are indeed present all four holes on truck bed 230 and 240. Accordingly, only an area of 10 pixels by 10 pixels, or 100 pixels total, is examined to look for each hole about its expected centerline coordinate pair. Thus, only 400 pixels out of 65,536 pixels in the image, or less than 1%, need be examined to ascertain that track body 61 is present by looking for four holes A–D.

Referring now to FIGS. 6 and 7, the manner in which the vision system 101 examines an image for the presence of window openings Q and P may now be further explained. The window openings Q and P are optically darker (as indicated by the speckling) than the surrounding areas of the side walls and roof of the rear passenger compartment 250. Accordingly, the front and rear window edges R and T and side edges S and U represent rapid transition regions between light and dark. To detect the presence of window opening Q, an image from camera 111 only need be examined roughly in the area from $X_R$ through $X_T$, and $Y_S$ and $Y_U$, which dimensions represent the expected locations of the edges R, T, S and U of the window opening Q. In the prototype system of the present invention, the window openings Q and P are always within in the same location of field-of-view 260 plus or minus five pixels when the body 63 is properly seated and located upon its supporting pallet. Window openings Q and P each occupy an area of approximately an area of approximately 200 pixels (about 25–30 pixels long by about 7–8 pixels wide). Thus, it can be appreciated that either the relative location of the window openings or their size (area) or both may be checked to determine whether the presence of these window openings are present in the image from camera 111. As in the FIG. 9 example, a tolerance may be specified as to precisely where the window is located, such as plus or minus five pixels or plus or minus 10 pixels. Similarly, a tolerance may be specified for the area, such as plus or minus 20 pixels. These tolerances may be stored as part of a set of reference information about prototypical body 63 in the software library or other memory of vision system 101.

Before explaining the precise procedure used by which the vision system 101 learns the pictorial attributes or features of the truck bodies that are to be recognized and how it actually distinguishes and identifies the three truck bodies, it is useful to discuss shorthand notation for distances between centroids (i.e., centers) of identified features such as the holes A–D and edges of the window openings Q and P. In order to determine distances between two features, the existence and location of the features must first be determined. The recognition of the existence of a feature by the IRI vision systems described above can be accomplished directly by extracting the feature from the gray level distribution of the image by using a histogram or profile function, or indirectly by first changing the RGS level values into binary values through the use of a segmentation operation (such as thresholding or blob labeling) and then extracting the outline of the feature by using a chain encoding function (which is a conventional image processing technique that codes an image contour as a chain of line segments having horizontal, vertical or diagonal direction) or by using a run length encoding function (which is a conventional image processing technique used in machine vision systems to detect lines or other geometric forms). Once the outline of a feature or object has been determined, it is simple matter to calculate its first three moments of inertia, namely its area, its centroid, (i.e., the X, Y coordinate pair representing its center of gravity), and its angle of orientation. (These three moments are derived automatically with a single call to an IRI library function named "IMOMENTS".) Also, for simple well-defined shapes such as the substantially square holes A–D shown in FIG. 4, it is a very straightforward matter to write a program which checks successive pixels in successive rows and columns of a window area of interest, and calculates the relative location of the object and its total area by directly examining the gray scale levels of the pixels, like those illustrated in FIG. 10. Also, once the relative location of a recognized feature, such as the square hole D, has been calculated, it is also a straightforward matter to calculate its centroid.

Once the centroids of two objects or blobs are known, the distance between them can be readily calculated. For example, the distance $D_{AB}$ between the centers of hole A and hole B can be calculated by using equation 1:

$$D_{AB} = [(X_A - X_B)^2 + (Y_A - Y_B)^2]^{0.5} \quad (1)$$

where $X_A$, $Y_A$ and $X_B$, $Y_B$ are the Cartesian coordinate pairs of holes A and B respectively. In a similar manner, the distances $D_{BC}$, $D_{CD}$ and $D_{AD}$ may be readily calculated, if desired.

It is also a simple matter to calculate the distance $D_{RT}$ between the front and rear edges of window opening Q shown in FIG. 6. To do this the average X dimension, namely $X_R$ of front edge R and the average X coordinate, namely $X_T$, of edge T can be calculated. Thereafter, the distance $D_{RT}$ can be calculated using Equation 2:

$$D_{RT} = X_R - X_T \quad (2)$$

Similarly, the distance between the average Y coordinates, $Y_S$ and $Y_U$, of side edges S and U may be calculated as per Equation 3:

$$D_{SU} = X_S - X_U \quad (3)$$

The distance between front and rear edges R' and T' and side edges S' and U' may be calculated in a manner similar to that of Equations 2 and 3.

(1) Learn Mode for Vehicle Body Identification

The learn mode of the vision system 101 with respect to identification of body styles may be described as follows. (Note: All steps are automatically performed by system 101 in the sequence discussed unless otherwise stated.) Step 1: Wait for a seven-foot pick-up truck body 61 to come to rest in position within area 260. Step 2: Snap an image of body 61 using camera 111. Step 3: Display the acquired image on CRT 118. Step 4: Enter interactive mode (by the operator pressing appropriate keys on keyboard 119) so that the operator can specify (by moving the "cross-hair" cursor 296 shown in FIG. 8 over each hole and pressing the "Enter" or "Return" key) the four holes A–D to be identified by system 101 on the truck bed 230. When the system 101 recognizes a bounded or enclosed feature, such as a hole (or window opening), a circle is drawn around the feature, thus allowing the operator to verify that the system has recognized the intended feature. Step 5: Calculate and automatically record the X, Y coordinates of the centers of each of the identified holes A–D as part of the reference data in a first set of information stored in the system software library of system 101. Step 6: Allow the human operator to type in (using keyboard 119) the English language identification, i.e. "seven-foot pick-up," for the reference data for vehicle body 61. Step 7: Derive the area of the holes, and record them as part of the reference data stored as the first set of information. Step 8: Derive distances $D_{AB}$, $D_{BC}$, $D_{CD}$, and $D_{AD}$, and record them as part of the reference data stored as the first set of information. This completes the learn mode for the seven-foot pick-up body style.

The learn mode for the six-foot pick-up truck body 62 is substantially identical to the procedures followed for the seven-foot pick-up truck body 61, and differs only in that holes A'–D' are being identified and that the X, Y coordinate information and areas for these holes is being stored as reference data in a second set of information.

The learn mode sequence for the square-backed vehicle body 63 is similar, but different in several respects and may be described as follows. Step 21: Wait for the square-backed vehicle body 63 to move to rest in position within area 260. Step 22: Snap an image of body 63 using camera 111. Step 23: Display the acquired image on CRT 118. Step 24: Enter interactive mode, so that operator can specify with the cross-hair cursor 296 the two window openings Q and P in the general manner described above with respect to the post holes in FIG. 8. When a bounded feature is recognized by the system 101, a suitable graphical symbol such as circle 298, shown in FIG. 6, is drawn about the feature. Step 25: Record the four average X, Y coordinates ($X_R$; $X_T$; $Y_S$; $Y_U$) for window opening Q and the four average X, Y coordinates ($X_{R'}$; $X_{T'}$; $Y_{S'}$; $Y_{U'}$) for the window opening P, as part of the reference data for a third set of information stored in the software library. Step 26: Allow the human operator to type in (via keyboard 119) the English language description or the body style 63. Step 27: Derive the areas $A_Q$ and $A_P$ of the window openings Q and P, and record them as part of the reference data in the third set of information. Step 28: Derive the distances ($D_{RT}$; $D_{SU}$; $D_{R'T'}$; $D_{S'U'}$) for the length and width of the windows Q and P, and record these distances as part of the reference data for the third set of information.

(2) Operating Mode For Vehicle Body Identification

The sequence of fully automatic steps performed by system 101 to identify the vehicle bodies as they are conveyed through the paint line 30 by conveyor system 54 will now be described. The references made to buffers 1, 2, 3 and 4 refer to the four 256×246 frame buffers located within the processing buffer block 178 shown in FIG. 2. Step 1: Turn on coprocessors 176, 180 and 182 to assist host computer 184, so that the identification of vehicle body style may be completed within 100 milliseconds. Step 2: If Retry Count (explained later) equals zero, wait until a vehicle body is in position within rectangle 260. (The programmable controller 103 sends the vision system 101 a signal just before or just after a vehicle is in position in section 66 of paint line 30.) Step 3: Snap an image using camera 111 and put it in buffer 1. Step 4: Display the snapped image on CRT 118. Step 5: Acquire RGS pixel data for all rows of the buffer 1 in the general vicinity of the truck body, and put such results in the buffer 2. Step 6: From the software library, get all of the reference data from the first set of information, which corresponds to the typical seven-foot pick-up truck body 61.

Step 7 is an iterative step, which is performed four times in order to detect the holes A, B, C, and D of truck bed 230, if indeed it is truck body 61 which is present. The substeps of Step 7 may be described as follows. Substep (a): Obtain the center X, Y coordinates for the typical first hole from the reference data. Substep (b): For the rows X−2 to X+2, move the actual RGS pixel data to buffer 3. Substep (c): See if there is a valley at pixel coordinates at Y−3 to Y+3. (By "valley" is meant a significant dip in the RGS values, e.g., more than twenty units, which lasts for a minimum of two contiguous pixels and a maximum of four contiguous pixels, and then returns to a higher RGS level.) Substep (d): Note whether a valley was found. Substep (e): Move the next row from buffer 2 to buffer 3, and repeat substeps (a) through (e) until all horizontal rows for the first hole have been examined. Substep (f): repeat the substeps (a) through (e) for the second through fourth holes. Substep (g): Determine if the valleys found in adjacent rows of each hole are connected. Substep (h): If the valleys are connected, compute the areas and centroids of each of the four holes A-D.

Step 8: See if the actual centroids of holes A-D computed in Step (7)(h) are within a distance of three pixels from the centroid locations on the holes A-D of the prototype body 61; if not, go to Step 21. Step 9: Compute actual distances $D_{AB}$, $D_{BC}$, $D_{CD}$ and $D_{AD}$ and then check to determine if these actual distances are within a predetermined tolerance (e.g. three counts or pixels) of the values for these distances in the reference data from the first set of prototype information; if they are not, go to Step 21. Step 10: See if the hole areas $A_A$, $A_B$, $A_C$ and $A_D$ are within a predetermined tolerance (e.g. plus or minus three pixels); if not, go to Step 21. Step 11: Identify the vehicle body whose image was snapped in Step 3 as a seven-foot pick-up truck body since Steps 8, 9 and 10 are satisfied. Step 12: Write the English legend "seven-foot pick-up" on the CRT 118 as an overlay upon the image displayed in Step 4, and as an overlay on CRT 118, draw white circles around the holes A-D to show that they have been recognized. Step 14: Send digital signal 1 to the programmable controller 103 over cable 126. Step 15: Go to Step 2, and wait for another vehicle body to move into position. (Note that if the Steps 8 through 10 mentioned directly above were not satisfied, the vehicle body whose image was snapped in Step 3 may be: a six-foot pick-up truck, a square-back truck, or an unrecognizable vehicle or object, and the sequence of steps continues as described below.)

In the preferred embodiment of the present invention, the software sequence is prepared so that the system 101 next checks to see if the yet-unidentified vehicle body in rectangle 260 is a six-foot pick-up truck, and if that is not satisfied, then checks to see if it is a square-back truck body. The sequence of Steps 21 through 30 used by system 101 to determine whether it is a six-foot pick-up truck body is substantially identical to the sequence of Steps 6 through 15 discussed above for the seven-foot pick-up truck body 61, and differs only in that: (1) the X, Y coordinate information for the holes and other reference data comes from the second set of reference information stored in the software library; (2) if body 62 is identified, a digital signal 2 is sent over cable 127 to programmable controller 103; and (3) if the checks (like those in Steps 9 and 10 above) are not satisfied, thus indicating that the body style is not recognized as a body 62, then go to Step 41.

The next sequence steps, Steps 41 through 52, are performed if the vehicle body is still unidentified in order to determine if it is a square-back truck body. Step 41: From the software library, get the reference data from the third set of reference information, which corresponds to the prototype square-back truck. Step 42: Examine the relevant portion of the vehicle body image in buffer beginning five pixels to the right of the expected location of front edge R through five pixels to the left of the expected location of rear edge T, on a row-by-row basis, and record the actual X coordinates for the detected edges. Step 43: From the buffer 1, acquire RGS data for the columns in which edges S, U, S' and U' are expected to occur and place these columns in the buffer 2. Step 44: Beginning with five pixels above the edge S and through five pixels below the edge U, examine RGS data in the columns and determine the actual Y coordinates of the horizontal edges S and U in the snapped image; do the same to locate the actual Y coordinates of the horizontal edges S' and U' of window opening P. Step 45: Compute the distances $D_{RT}$, $D_{SU}$, $D_{R'T'}$, and $D_{S'U'}$. Step 46: Compute the areas $A_Q$ and $A_P$ of the window openings Q and P. Step 47: See if the distances computed in Step 45 are within a predetermined tolerance (e.g., three counts) of the corresponding values from the prototype truck body recorded in the third set of information; if not, go to Step 61. Step 48: Determine if the areas $A_Q$ and $A_P$ are each within a predetermined tolerance (e.g., plus or minus 12 pixels) of the areas computed for the prototype vehicle body 63; if not, go to Step 61. Step 49: Identify the vehicle body whose image was snapped in Step 3 as a "square-back truck." Step 50: Overlay the descriptive field "square-back truck" on the CRT 118. Step 51: Send a digital signal 3 via cable 128 to the programmable controller 103. Step 52: Go to Step 2.

If vision system 101 failed in its first pass through Steps 1 through 48 to successfully identify the vehicle body in area 66 whose image was snapped by camera 111 as one of the three body styles it has learned, the system 101 will retry the sequence of steps after performing a feature enhancement operation upon the snapped image in an effort to more clearly see the distinguishing features of the vehicle body in question. If it is still unable to identify the vehicle body, then the system 101 will so indicate by providing a message on CRT 118 and sending an appropriate signal the controller 103. The system 101 will only enhance the snapped image once. A software flag named "Retry Count" is used to determine when the system is trying a second time to identify the vehicle body from the image snapped in Step 3. The Steps 61-67 described below are the preferred implementation for the retry sequence just described. Step 61: If Retry Count equals 1, then go to Step 65. Step 62: Set Retry Count equal to 1. Step 63: Execute a feature enhancement function called a "minimum filter" whose software call is "ILMED" in the IRI image processing library. This function is performed upon all pixels in the entire image stored in buffer 1, and the results of the enhancement are put back in buffer 1. In the preferred embodiment, this minimum filter function operates on a three-by-three pixel neighborhood, and it replaces the gray level of the center pixel by the smallest of the gray levels in its neighborhood. (This function has the effect of slightly enlarging and more sharply defining all of the darkened areas, e.g. the post holes and window openings, of the image being analyzed.) Step 64: Go to Step 5 (for the purpose of repeating all of the steps thereafter, as needed, in an effort to identify the vehicle body in the snapped image from Step 3 and enhanced by Step 63). Step 65: Put the message "unable to identify vehicle body" on the CRT 118. (This message is appropriate since the only way to get to Step 55 is from Step 61.) Step 66: Output a digital signal 4 to the controller 103 via cable 129. Step 67: Go to Step 2 (to wait for another vehicle body to identify). This completes the description of the preferred embodiment of the steps used to identify the vehicle body types presented at section 66 of the paint line 30.

D. Intrusion-Sensing At Paint Booth Entrance

FIG. 11 is a simplified side elevational view taken along line 11—11 of FIG. 1. The camera 113 is used to observe a narrow area generally bounded by dashed lines 310 in FIG. 1 and 311 in FIG. 11, extending between the lens of camera 113 and a diffused light panel 312 which contains a plurality of vertically arranged fluorescent tubes mounted in front curved reflectors and behind a translucent diffuser. Accordingly, the light panel 312 appears as a reasonably bright and uniform, all-white surface. Accordingly, anything interposed between the light panel 312 in the field of view of camera 113 appears as a relatively dark object seen in profile by camera 113. In FIG. 11, the top 314 of the passageway 316 through the silhouette tunnel 68 is indicated by dashed lines. The front end 318 of a typical vehicle body 320 is shown protruding from the exit 322 of the silhouette tunnel 68. The body 320 could be any one of the bodies 61, 62 or 63 since the shape and size of each of their front ends is very similar, especially when viewed in profile. When the vision system 102 to which the camera 113 is connected detects the front end 318 of vehicle body 320 reaching a predetermined location such as is indicated by the vertical line 324, the vision system 102 will send a signal via interface board 142 and cable 146 to the programmable controller 104, which can be used as a zone start signal.

FIG. 12 shows a human being 330 coming out of the exit 322 of the silhouette tunnel 68. His profile is readily visible against the lighting panel 312 by camera 113. The vision system 102 can readily distinguish between a typical vehicle 320 and the typical human being 330 by determining the average pictorial characteristics of each. Specifically, I have determined that the front end 318 of the average truck 320 exiting from passageway 316 of silhouette tunnel 68 has a centroid 332 which is much lower (that is, vertically displaced below) the average centroid 334 of a human being 330 walking in an erect or semi-erect position as he exits from the passageway 316.

(1) Learn Mode For Intrusion-Sensing

The preferred sequence of steps used in a learn mode to teach the vision system 102 what the average centroid of the front end 318 of vehicle body 320 is and what the average centroid 334 of typical human 330 will now be described. Step 1: Turn on the coprocessors of vision system 102. Step 2: Snap an image of the empty background (that is, when no car body or human body is present) as a reference frame and store it in buffer 2. Step 3 is an iterative step repeated twenty times and consists of the following substeps. Substep (a): With a human being walking from right to left, snap an image when the human being gets very near the exit 322 of the passageway 316 and store it in buffer 1. Substep (b): Subtract buffer 2 from buffer 1 to obtain a blob, and store the blob temporarily in buffer 3. Substep (c): Derive the centroid of the blob in buffer 3. Substep (d): Add the centroid of the blob in buffer 3 to a variable (which is initially zero) named "centroid total." Substep (e): While a human being walks from left to right in FIG. 11, and is just exiting the passageway 316, snap another image and store it in buffer 1. Substep (f): Buffer 2 is subtracted from buffer 1 and the results stored in buffer 3. Substep (g): The centroid of the blob in buffer 3 is computed and added to the current value of "centroid total." Substep (h): Substeps (a) through (g) are repeated 19 times. Step 4: Calculate a human centroid average by dividing the value of centroid total by 40. Step 5: Record the human centroid average in the library as reference data. Step 6: Perform the following substeps (a) through (c) a predetermined number of times, such as twenty, for each of the three different body styles to be recognized. Substep (a): Snap an image using camera 113 of a car body as it begins to exit as shown in FIG. 11 from the passageway 316 of the silhouette tunnel 68, and store the snapped image in buffer 1. Substep (b): Subtract buffer 2 from buffer 1, and put the results in buffer 3. Substep (c): Compute the centroid of the blob in buffer 3, and add it to the variable centroid total (which is initially zero at the start of Step 6). Step 7: Compute the vehicle centroid average by dividing the value of centroid total by 60. Step 8: The vehicle centroid average is recorded as reference data in the software library. This completes the learn mode for the intrusion and zone start signal.

(2) Operating Mode for Intrusion-Sensing

During paint line operation, the following sequence is presently preferred for producing the intrusion and zone start signals. Step 1: Turn on the coprocessors. Step 2: Snap an image of an empty scene (i.e., no vehicle body, human or foreign object present) and store it in buffer 2. Step 3: Read the average human centroid value and the average vehicle body centroid value from the software library. Step 4: Snap an image with camera 111, and store it in buffer 1. Step 5: Subtract buffer 1 from buffer 2 and store the results in buffer 3. Step 6: If buffer 3 is empty (indicating that nothing has changed in the field of view of camera 113), then go to Step 4. Step 7: Compute the centroid of the blob in buffer 3. Step 8: If the Y coordinate of centroid of the blob is equal to the vehicle centroid average within a tolerance of two counts, and the X coordinate of the centroid of the blob has reached a predetermined point, then issue a start zone signal (digital signal 1) over cable 147 and go to Step 11. Step 9: If the Y coordinate of the centroid of the blob in buffer 3 is equal to the average human centroid value within a predetermined tolerance (such as two counts), then issue a signal (digital signal 2) on cable 148, indicating human intrusion at the entrance to the electrostatic paint spray booth 36, and go to Step 1. Step 10: If this step is reached, the object in the field of view of camera 113 has not been recognized as a vehicle body or a human body. Accordingly, issue digital signal 3 over cable 149, indicating that an unrecognizable object has intruded into the field of view of camera 113.

To determine. when the unrecognized object has moved out of the field of view yet, Steps 11 through 13 are performed. Step 11: Snap another image with camera 113 and store it in buffer 1. Step 12: If buffer 1 is equal to buffer 2, go to Step 4. Step 13: go to Step 11.

E. Monitoring Clearance Between Roof Machine and Vehicle Body

FIGS. 13 and 14 are a side elevational view and an end view respectively taken along line 13—13 and line 14—14 of FIG. 1. FIGS. 13 and 14 illustrate in simplified form a ceiling-mounted roof machine 81 including platform 80 poised above the front hood section 248 of vehicle body 62. The platform 80 provides the mounting support for the three paint bells 77–79. The platform 80 is in turn supported by a ceiling-mounted superstructure 340, which is shown in highly simplified form since the particular design of the superstructure 340 and platform 80 form no part of the present invention. The platform 80 is movable in a vertical direction under the control of hydraulic cylinder 342 whose rod 344 has sufficient downward travel to allow the bells 77–79 to paint the inside bottom surface of the beds 230 and 240 of truck bodies 61 and 62 and sufficient upward travel to provide the needed clearance above the cab sections 236 and 246 of truck bodies 61 and 62. The superstructure 340 may include slotted guide bars 346– 349 rigidly fastened to transverse crossbeams 350 and 352, while the hydraulic cylinder 342 is connected to a longitudinal beam 354 between crossbeams 350 and 352. A pair of guide frames 356 and 358 each have four roller guide means, such as captive roller assemblies 359, to slidably interconnect the guide frames to guide bars 346–349, to stabilize the platform 80 and prevent it from moving in any direction except in the vertical direction allowed by the slots and members 346-349.

Figure 15:
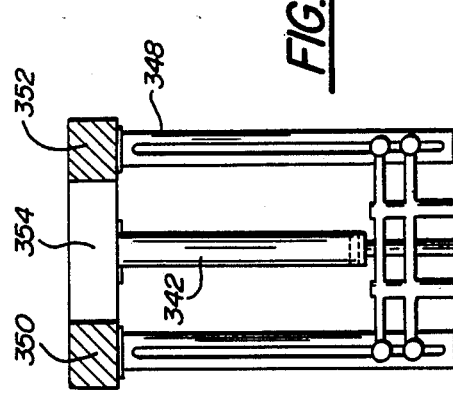
FIG. 15 is a side elevational view showing the roof machine depicted in FIGS. 13 and 14 in position to paint the inside of the bed of a six foot pick-up truck body.

The platform 80 is shown in a simplified fashion in FIGS. 13 and 14. Typically, it includes several dozen valves and hoses for paints of various colors, solvents, air lines, and the like (not shown), familiar to those in the painting equipment art. Attached to the righthand side of platform 80 by a rigid bracket 360 is a rectangular high-contrast optical target 362 which includes a bright white central area 364 surrounded by a broad black rectangular stripe 366. The target 362 provides an easily-recognized, highly visible optical feature for the camera 114 shown in FIG. 1 to focus upon. The bracket 360 includes a transverse horizontal section 368 and a vertical extension 370 extending downwardly therefrom, as best shown in FIG. 14. If desired, the bracket 362 may be omitted entirely, by mounting the target 362 directly upon the end of the platform 80. However, the bracket 362 permits the target to hang outside of the bed 240 of the vehicle body during the painting of the bed by the roof machine 81 as illustrated in FIG. 15.

As best seen in FIG. 1, the third camera 114, which is the second camera of vision system 102, has a field of view indicated by dashed lines 380 which encompasses the lower portion of roof machine 81 and a portion of the vehicle body thereunder (if any). As in FIGS. 11 and 12, diffused white lighting panels 382 are vertically arranged along the far wall opposite the camera 114 so that the lower portion of the roof machine, and the car body will appear as relatively dark objects in profile against the white background provided by lighting panels 382. Like the panel 312, each lighting panel 382 typically includes a plurality of fluorescent tubes, one or more curved reflectors therebehind, and a translucent white panel on the front side to provide a uniform white background. For convenient reference, the outline of the panels 382 is shown in FIG. 13 by dashed lines.

Using camera 114, the vision system 102 monitors the clearance between the roof machine 81 and, in particular, the bells 77–79 and the vehicle bodies to be painted, such as vehicle body 62. The bottom of paint bells 77–79 are all at the same elevation as shown in FIG. 14; therefore, the camera 114 generally only sees the profile of the bell 77. While the clearance between the paint bells 77–79 and the truck bodies can vary from a minimum of about six inches to about two feet, the closer distances, such as seven to nine inches, are preferred for electrostatic paint spray machines because paint transfer efficiency improves with such closer distances. In an electrostatic paint spray operation, the part to be painted, such as a metallic vehicle body, is typically held at about 0 volts or ground potential, and the paint is highly negatively charged to as much as 70,000 volts or so. Accordingly, the paint is literally drawn by electric forces to the surface of the object to be painted resulting in relatively high transfer efficiency with a minimum of overspray and paint mist. Because the paint travels so quickly from the bells to the truck body, the light from the diffuse lighting panel 382 is not detrimentally obscured by the paint spray, thus permitting the system of my invention to measure the approximate clearance (i.e. the distance) between the paint bells 77–79 and nearby portions of the truck body.

As is well known in the art, it is important to maintain the desired clearance between the paint bells and the object and to avoid the possibility of fire due to arcing between the bells and body being painted. Typically, the paints being applied are rather flammable, and thus the possibility of fire due to arcing must be carefully guarded against. In the prototype system of my invention, an area of interest 390, which may be conveniently called a bubble, is defined beneath the bell 77 and extends downwardly in the vicinity of the nearby portion 248 of the truck body 62. The size of the bubble is variable, since the bubble in fact does not physically exist; it is a construct of the software of the vision system 102 which monitors the region of interest 390 that exists between the bells 77 and truck body. The size and shape of the area of interest may be arbitrarily defined within limits. For convenience, the prototype system of my invention considers the area of interest to be circular as shown in FIGS. 13 and 15. If any portion of the vehicle body invades the area of the bubble, the vision system 102 so notifies the programmable controller 104 so that appropriate action may be taken, such as the immediately raising platform 80. The vision system 102 determines the precise location of the relevant portion of the vehicle body within the field of view of camera 114 and also determines the precise location of the target 362. Knowing the location of the target, and the physical relation between the position of the target and the bell 77, it is a simple matter for the vision system 102 to calculate the location of the bubble. For example, if the centroid of the target area 364 is at $X_J$, $Y_K$, the system 102 can calculate the center 394 of the bubble 390 and the circumference of the bubble at coordinates $X_L$, $Y_M$ by knowing the values of the horizontal and vertical dimensions indicated by arrows 396 and 398. The benefit of using the target 362 is that it is highly visible and readily found, even as lighting conditions change somewhat. To help make the target more visible, a lighting panel (or two) may be located somewhat behind and to the side of the camera 114, if desired. Those in the art should appreciate that, if desired, the vision system 102 could be programmed to recognize the shapes of the bells 77 or distinctive features of the platform 80 located nearby the bell (if any). While this is possible, I have found it much better to use a high contrast target, such as target 362, which has a predetermined fixed relationship with respect to the portions of the platform 80, namely bells 77–79, of interest in terms of maintaining a specified clearance.

FIG. 15 is a side elevational view showing the platform 80 lowered by hydraulic cylinder 342 into the bed 240 of truck body 62 in order to paint the interior bottom surface 400 of the bed. As previously mentioned, since the support bracket 340 upon which the target 362 is mounted enables the target to hang outside of the truck bed 240, the clearance between the paint bells 77–79 and the inside bottom 400 can be determined, even though the bells 77–79 and part of the lower portion of platform 80 are hidden by sidewall 241 of the bed 240.

If the target 362 is mounted directly to the platform 80 in about the same location shown in FIGS. 13 and 15, the target would partially disappear within the bed 240 when the roof machine 81 is in the position shown in FIG. 15. This could present a problem in terms of properly identifying the location of the bells 77 using the target 362. To avoid this problem, a second target 402, preferably of somewhat different geometric shape (perhaps square instead of rectangular) could be provided. Then, when the vision system recognized that the first target 362 was about to be obscured by the sidewall of the bed 240, it could look to target 402 and calculate therefrom the position of the bell 77 relative to the bed 240.

In prototypes of the present invention, the vertical movement of the platform 80 is controlled by programmable controller 104 in synchronization with the position of the truck body being painted. This synchronization is determined by the controller 104 keeping precise track of the incremental travel of the belt conveyor 56, and hence the truck bodies thereon, due to frictional (or other) engagement of the pallets thereunder with the belt conveyor. The system of the present invention could be programmed, however, to provide control signals to specify to the controller 103 how much to raise or lower the platform 80 in order to ensure proper clearance between the paint bells 77–79 and the truck bodies, as will be further explained shortly.

Figure 16:
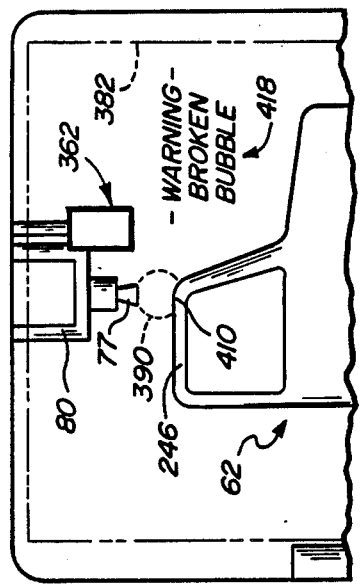
FIG. 16 is a simplified front view of the upper two-thirds of the screen of a CRT display showing a simplified side view image, from the third camera in FIG. 1, of a pick-up truck body wherein the paint bell of the roof machine is too close to the roof of a pick-up truck.
Figure 17:
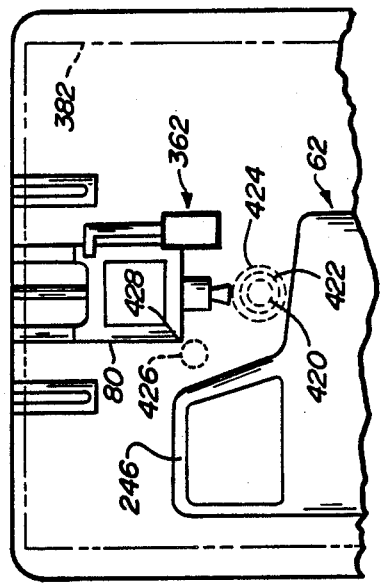
FIG. 17 is simplified front view of the upper two-thirds of the screen of a CRT display showing a simplified side view image from the third camera in FIG. 1 of a pick-up truck body, showing three concentric zones about the paint bell and a fourth circular zone near the front edge of the roof machine.

FIGS. 16 and 17 are front views of a CRT, such as CRT 138 or optional CRT 153, with each CRT displaying the image seen in the field of view of camera 114. FIG. 16 shows the roof machine 80 and paint bells 77 positioned above, but too close to, the roof of the cab section 246, so that a portion 410 of the cab section 246 has entered the guarded zone or bubble 390, which is often referred to as a "broken bubble" condition. This is appropriately communicated to observers of the CRT by placing or repetitively flashing a suitable legend 418, such as "Warning - Broken Bubble," as an overlay on the image being displayed on the CRT and/or by deleting that portion of the bubble 390 in contact with the nearby portion 410 of the object being painted, as shown in FIG. 16. Alternatively, any other visual or aural indication may be used to call attention to the broken bubble condition.

FIG. 17 shows yet another simplified view of the screen of CRT 138 (or 153) having not one, but four, areas of interest, three of which are indicated by concentric bubbles 420, 422 and 424 centered beneath the bells 77 and of three different diameters. The fourth zone of interest is bubble 426 which is located diagonally off the lower lefthand corner 428 of platform 80. The three concentric bubbles 420–424 of FIG. 17 illustrate that the system 102 can, if desired, calculate areas of interest of different sizes, including overlapping and/or concentric areas. More importantly, FIG. 17 illustrates one method of controlling the clearance or spacing between the bells 77 and the nearby portions of the vehicle body to be painted. Concentric bubbles 422 and 424 may be respectively used to define the minimum desired clearance and the maximum desired clearance between the bells 77 and the object to be painted. Thus, the vision system 102 can command the platform 80 of the roof machine to be lowered until the bubble 424 is broken by the object to be painted. However, the bubble 422 should not be broken by the object to be painted, and if it is, the roof machine should be raised slightly so that it is no longer broken. The inner concentric bubble 420 can be used as the safety bubble which, if broken by the object to be painted, causes the platform 80 to be pulled up rapidly and an appropriate warning given of this abnormal condition (which should not have occurred).

The fourth bubble 426 illustrates that the vision system 102 can readily define areas of interest other than those directly beneath or near the paint bells 77–79. Thus, if the corner 428 of platform 80 comes too close to the truck body, so that the bubble 426 is broken, the vision system 102 can notify the controller 103 so that appropriate action is taken. The location of bubble 426 can be readily calculated once the centroid of the target area 364 is determined, using the same basic techniques used to calculate center 394 of bubble 390. Having described the general operation of the vision 102 with respect to the images taken by camera 114, a more detailed description of a preferred sequence of operation with respect to the clearance between bells 77–79 and the truck bodies will now be described.

(1) Set-Up Procedures For Clearance Monitoring

In order to set up camera 114 to properly perform in the prototype system of the present invention, I first set the dual high-low thresholds used for locating the target 362 and the single threshold used to binarize the image when the profile of the vehicle body and the roof machine is to be determined. The dual threshold levels are used to enhance the image from which the location of the target will be determined, and they are set in the following manner. First, the RGS level at which the dark background objects begin to bleed into the black perimeter 362 of the target 366 is determined, and the low threshold is set at a predetermined amount (such as five RGS levels) therebelow. Next, the RGS level at which the white portion 364 of the target begins to bleed into the black perimeter 366 of the target 362 is determined, and the high threshold is set a predetermined amount (such as five levels) therebelow. Thereafter, an image of the target in a known location is snapped, and the area in X coordinates of the centroid of the target is computed and recorded as reference data in the software library. Alternatively, the white area 364 of the target may be hard-coded as a constant in the applications software, if desired.

(2) Operating Mode For Clearance Monitoring

The sequence of operating steps may now be described. Step 1: Vision system 102 using camera 114 snaps an image of the portions of the roof machine 81 and vehicle body within the field of view of camera 114, and the snapped image is loaded into buffer 1. Step 2: A vertical strip from the snapped image in buffer 1 that is centered about the vertical center line $X_j$ of the target 362 and is slightly wider than the target loaded into buffer 2 using an "enhance interval" image processing function which reduces gray scale values beneath the minimum threshold level to zero and raises gray scale values above the maximum threshold value to a gray scale value of 255. The result of this process is that one or more blobs are present in buffer 2, one of which is the target. Step 3: Perform blob analysis to locate all blobs within buffer 2 by performing three substeps as follows. Substep (a): Locate all edges or contours which might be associated with blobs by processing buffer 2 with a "run-length encoding" image processing algorithm (such as "IRLEN" from the IRI software library), and load the result back into buffer 2. Substep (b): Identify all discrete, non-connected blobs by processing buffer 2 with a blob labeling algorithm (such as "LABELPIC" from the IRI software library). Substep (c): Compute the area and centroid of each discrete blob identified in substep (b). Step 4: For each discrete, non-connected blob identified by Step 3, compare the actual area and X coordinate of the centroid for that blob against the reference data stored during the set-up preparations for the area and centroid of target 364. If the area for a blob is within a first tolerance (such as plus or minus three pixels), and if the X coordinate is within a second tolerance (such as plus or minus two pixels of the X coordinate from the reference data for the target), then identify the blob in question as the target. Step 5: Compute the X, Y coordinates of the center 394 of the bubble 390, which represents the area of interest to be monitored for invasion by the vehicle body. Step 6: Having identified the center 394 of the bubble 390, generate an all-white bubble 390 and put the bubble into buffer 3, which previously was filled with zeros (so that it would initially be interpreted as being all black). Also, erase buffer number 2 (fill it with zeros, and also put the bubble in buffer 2). Step 7: Locate the car body profile and roof machine profile in the snapped image of buffer 1 by binarizing the image, such that every object within the snapped image, except for the bright white background of lighting panels 382 appears black, and put the results in buffer 4. Step 8: Map buffer 4 into buffer 3 by having the black values (level zero) overwrite the white values (level 255) in buffer 3. (Note that if the vehicle body intrudes into the all-white bubble, this can be detected by examining buffer 3 to determine if any white pixels associated with the bubble have turned black, which is done in Step 9.) Step 9: Perform a logical AND operation by mapping buffer 3 into buffer 2 so that only pixels which are all-white (level 255) in both buffer 2 and buffer 3 remain in buffer 2, with all other pixels being given a zero value. Then, compute the area of the bubble (by counting pixels) in buffer 2, and compare the pixel count against the area (i.e., pixel count) of the original size of the bubble. If the number of pixels in the bubble of buffer 2 is more than a predetermined number of pixels less than the original bubble (such as ten pixels), system 102 informs programmable controller 104 that a bubble has burst. At this point, the vision system 102 stops (i.e., does not further process images snapped by camera 114) and displays the actual burst bubble condition which has been detected (as in FIG. 16). Step 11: If the bubble has not burst, go to Step 2 to repeat the process.

The foregoing sequence of Steps 1 through 10 is performed by the vision system 102 in about 80 milliseconds. Thus, it is possible for the vision system to perform this sequence ten times (or more) per second, and thereby effectively continuously monitor the clearance between the bell 77 and the vehicle body thereunder. In order to permit the operator/observer of the CRT 138 (or 154) to verify that the system 102 is performing correctly, the vision system 102 displays only a small fraction of the total number of images of the scene snapped by camera 114. Specifically, I have found that by displaying only about one out of ten images of the type generally shown in FIGS. 16 and 17, humans watching the CRT are able to visually verify that the bubble 390 appears to be properly placed between the paint bell 77 and the vehicle body. This helps convince them that in fact that the vision system 102 is working properly.

A technique I found helpful to achieving the high speed operation just described is processing only the regions of interest, where the objects to be detected are sure to be located. Thus, in Step 2, for example, my software is programmed only to look at the vertical strip in which the target 362 must be located.

With respect to the clearance monitoring operation performed by camera 114 and vision system 102, there is a need to test the system under actual operating conditions without actually making the paint bells 77–79 come too close to the truck body being painted. In the prototype system of the present invention, non-destructive testing of the system 102 is accomplished by simply enlarging the diameter of the bubble so that during a portion of the painting operation of a car body, the car body intrudes upon the bubble, thus causing system 102 to notify the programmable controller 104.

F. Epilogue

While the foregoing detailed description has related to the use of vision systems on automotive vehicle paint lines, particularly those with electrostatic paint spray booths, those skilled in the art will appreciate that the vision system and methods of the present invention are equally applicable to other automated painting equipment, including painting equipment with non-contact reciprocating applicators, spraying wands and the like. In other applications, where the amount of paint splatter or overspray is greater, it is only necessary to ensure that the camera lens and light sources remain relatively clean, so that the vision system will still be able to see the objects of interest within its field of view. Since the cameras can be and normally are mounted a significant distance from the scene they are observing, this is usually not a problem.

As used herein and in the claims below, the following selected terms may be further defined as follows: The term "pictorial attributes" is meant in a general sense to include any visually perceptible or visually distinguishable attributes of an object, including a person, within the field of view of camera means. The term "camera means" includes standard RS170 output video cameras, as well as any other solid-state or tube-type camera device (e.g., CCD array, vidicon) which produces electronically processable signals representing a two or three-dimensional scene, by perceiving or discerning images of the scene using non-contact optical techniques. The term "automotive vehicle bodies" includes car bodies, truck bodies or both types of bodies, or major portions thereof, such as by way of example and not limitation hoods, fenders, passenger compartments and truck beds. The term "image analysis system" includes any type of digital or analog processing system for extracting, distinguishing, enhancing, or otherwise analyzing electronic or other signals representing information corresponding to all or a two (or more) dimensional portion of an image perceived or discerned by a camera means.

The foregoing detailed description shows that the preferred embodiments of the present invention are well-suited to fulfill the aforementioned objectives and provide the advantages above-stated. It is recognized that those in the art may make various modifications or additions to the preferred embodiments chosen to illustrate the present invention without departing from the spirit and scope of the present invention, which is defined by the appended claims, including all fair equivalents thereof.

I claim:

1. Vision apparatus for automated painting equipment, comprising:
   (a) at least one camera means for acquiring successive images of a first scene from a first portion of the painting equipment including at least a first movable object to be identified via selected pictorial attributes thereof; and
   (b) an image analysis system for digitally processing successive images received from said camera means, said system including (1) means for recognizing selected pictorial attributes of the first object when such attributes are present in at least one of the successive images (2) means for comparing the recognized attributes of the first object with corresponding reference data from a first set of information previously stored in the system, and (3) means for identifying the first object as being present in the first scene when a match within a predetermined first tolerance exists between at least one of the recognized pictorial attributes and corresponding reference data from the first set of information.

2. Vision apparatus as in claim 1, further comprising:
   (c) means for communicating the identification of the first object as being present in the first scene to the automated painting equipment.

3. Vision apparatus as in claim 1, further comprising:
   (c) means for visually communicating the identification of the first object as being present in the first scene to a human being.

4. Vision apparatus as in claim 3, wherein means (c) includes a two dimensional image display means for displaying at least part of the scene containing the first object for which a positive identification has been made.

5. Vision apparatus as in claim 1, wherein the image analysis system further includes:
   (4) means for determining when the first object has moved into the scene sufficiently to have reached a predetermined location within the first scene.

6. Vision apparatus as in claim 5, wherein the image analysis system further includes:
   (5) means for sending a signal to the painting equipment when the first object has reached the predetermined location within the first scene.

7. Vision apparatus as in claim 1, wherein the image analysis system further includes:
   (4) means for recognizing the entry of a human being into the first scene.

8. Vision apparatus as in claim 7, wherein the first portion of the painting equipment is an electrostatic paint spraying area, and the first scene thereof includes at least one entrance way through which a human being might enter the painting spraying area.

9. Vision apparatus as in claim 1, wherein the first scene includes a second movable object to be identified via selected pictorial attributes thereof, and wherein the image analysis system further includes:
   (4) means for recognizing selected pictorial attributes of the second object when such attributes are present in at least one of the successive images at the same time selected attributes of the first object are present therein, (5) means for comparing the recognized attributes of the second object with corresponding reference data from a second set of information about the second object previously stored in the system, and (6) means for identifying the second object as being present in the first scene when a match within a predetermined second tolerance exists between at least one of the recognized attributes of the second object and the corresponding reference data from second set of information.

10. Vision apparatus as in claim 9, wherein the image analysis system further includes:
    (7) means for determining from at least one of the successive images a distance between a selected first portion of the second object and a portion of the first object nearby the selected first portion of the second object.

11. Vision apparatus as in claim 10, comprising:
    (c) means for comparing the determined distance against a plurality of predetermined values representing maximum and minimum operating distances to be maintained between the selected first portion of the second object and the first object during painting, and
    (d) means for communicating to automated painting equipment whether the determined distance is less than, between, or greater than the predetemined distances.

12. Vision apparatus, as in claim 10, further comprising:
    (c) means for communicating to the automated painting equipment that the determined distance is less than a specified minimum distance.

13. Vision apparatus as in claim 12, wherein the minimum distance is a minimum safe clearance distance, and wherein the apparatus further comprises:
    (d) means for commanding the automated painting equipment to take remedial action when the determined distance is below the minimum safe distance so that automated painting equipment will cause the determined distance to become larger promptly.

14. Vision apparatus as in claim 9, further comprising:
    (c) means for visually displaying, as part of at least one of the images of the first scene, at least one graphical symbol representing a monitored area of interest adjacent to a selected first portion of the second object into which the first object might possibly intrude, but is not suppose to intrude.

15. Vision apparatus as in claim 14, wherein the selected first portion of the second object includes at least one non-contact paint spray applicator, and the first object is an object to be painted at least in part by the one paint spray applicator.

16. Vision apparatus as in claim 15, wherein the automated paint equipment is a paint line for painting automotive vehicle bodies, and the first object is at least part of an automotive vehicle body.

17. Vision apparatus as in claim 16, wherein the camera means is located to acquire successive images of at least one upper side portion of the automotive vehicle body, and the second object is an automated paint spray machine for painting the vehicle body from above the body.

18. Vision apparatus as in claim 1, further comprising:
(c) means for selectively displaying, when the vision system is processing successive images at a rate higher than the ability of a human being to follow closely, only a few of many images being successively received by the image analysis system, whereby the human being may visually verify an appearance of correct operation of the system.

19. Vision apparatus as in claim 18, further includes:
(d) means for visually displaying, as part of the few images selectively displayed of the first scene, at least one graphical symbol representing a monitored area of interest adjacent to a selected first portion of the second object into which the first object might possibly intrude, with said displayed symbol being disposed between displayed images of the first object and the selected portion of the second object, with the displayed symbol being substantially stationary to with respect to the displayed image of the second object, and contactible by the displayed image of the first object when the first object gets too close to the second object.

20. A method of using a machine vision system in connection with the operation of automatic painting equipment, comprising the steps of:
(a) acquiring, through the use of at least one camera means, successive images of a first scene associated with at least a first portion of the automated painting equipment, the first scene from time to time including therein at least a first movable object having selected pictorial attributes; and
(b) processing successive images received from the camera means using an image analysis system by (1) recognizing selected pictorial attributes of the first object within the first scene, (2) comparing the recognized attributes of the first object with corresponding reference data from a first set of information previously stored in the image analysis system, and (3) identifying the first object as being present in the scene when a match within a predetermined first tolerance exists between at least one of the recognized attributes and the corresponding reference data from the first set of information.

21. A method as in claim 20 including a task definition procedure performed before steps (a) and (b), further comprising the steps of:
(c) acquiring an image of a typical first object to be identified;
(d) placing the image analysis system in a learn mode; and
(e) instructing the image analysis system as to which of the pictorial attributes of the typical first object are to be stored as part of the first set of information for use during step (b).

22. A method as in claim 20, further comprising the steps of:

(c) acquiring at least one reference image of the first scene when the first scene does not contain the first object;
(d) storing the reference image in the memory of the image analysis system;
(e) comparing a subsequently acquired image of the first scene with the stored reference image to determine whether an object to be evaluated has moved into the scene.

23. A method as in claim 22, further comprising the step of:
(f) producing a signal which is sent to the automated painting equipment when an object is detected in the first scene.

24. A method as in claim 23, wherein the first object is inanimate, and wherein the signal indicates that the detected object has been identified as the first object.

25. A method as in claim 23, wherein the signal indicates that a human being has moved into the first scene.

26. A method as in claim 23, wherein the signal indicates that an object has been detected as being present in the first scene, and that the image analysis system has been unable to identify it.

27. A method as in claim 20, wherein the first object is an automotive vehicle body selected from a predetermined group of different styles of automotive vehicle bodies.

28. A method as in claim 20, wherein the selected pictorial attributes of the first object to be recognized are small features of the first object which collectively occupy less than 15% of the total area of the first object as viewed by the one camera means, and which occur at known locations of the first object.

29. A method as in claim 28, wherein step (b) further comprises the substep of:
(4) calculating the area of at least one of the small features.

30. A method as in claim 29, wherein step (b) further comprises the substep of:
(5) determining the centroid of the area of the one small feature.

31. A method as in claim 30, wherein step (b) further comprises the substep of:
(6) comparing the area and centroid of the one small feature with expected values of the area and centroid for the one small feature previously stored in the system.

32. A method as in claim 20, wherein step (b) further comprises the substeps of:
(4) recognizing selected pictorial attributes of a movable second object within the first scene, (5) comparing the recognized attributes of the second object with corresponding reference data from a second set of information previously stored in the image analysis system, and (6) identifying the second object as being present in the first scene when a match within a second predetermined tolerance exists between at least one of the recognized attributes of the second object in the first scene and the corresponding reference data from the second set of information.

33. A method as in claim 32, wherein step (b) further comprises the substeps of:
(7) determining the relative location of the second object within the first scene, and (8) calculating the perceived clearance between a portion of the first object and a first portion of a second object, and wherein said first portion of the second object has a predetermined substantially constant relationship relative to the recognized attributes of the second object.

34. A method as in claim 33, wherein the recognized attributes of the second object are associated with a high contrast target of predetermined geometric shape.

35. A method as in claim 34, wherein the second object is at least part of a roof machine, and the first portion of the second object includes at least one electrostatic paint spray bell.

36. A method as in claim 35, wherein the first object is an automotive vehicle body to be painted by the painting equipment.

37. A method as in claim 32, further comprising the steps of:
(c) providing a visual display of at least some of the images from the camera means of the first scene which shows at least the first portion of the second object and the portion of first object if any relatively near to the first portion of the second object; and
(d) providing a symbol occupying a predetermined amount of area which is illustrative of a guarded zone adjacent to the first portion of the second object in to which the first object is normally not supposed to intrude.

38. A method as in claim 37, wherein the predetermined amount of area may be enlarged in order to simulate the response of the image analysis system and painting equipment to an intrusion of a portion of the first object into the guarded zone.

39. Vision apparatus for automated painting equipment which paints automotive body parts passed thereby on an automated conveying system, comprising:
(a) at least one camera means for acquiring successive images of a first scene from a first portion of the painting equipment including at least a first movable automotive body part to be identified via selected pictorial attributes thereof; and
(b) an image analysis system for digitally processing successive images received from said camera means, said system including (1) means for recognizing selected pictorial attributes of the first body part when such attributes are present in at least one of the successive images, (2) means for comparing the recognized attributes of the first body part with corresponding reference data from a first set of information derived at least in part from images of a prototypical first automotive body part previously stored in the system, and (3) means for identifying the first body part as being present in the first scene when a match within a predetermined first tolerance exists between at least a plurality of recognized pictorial attributes and corresponding reference data from the first set of information; and
(c) means for communicating to the automated painting equipment that the first body part has been positively identified as being present in the first scene, the means for communicating including a two dimensional image display means for displaying at least part of the scene containing the first body part for which a positive identification has been made.

40. Vision apparatus as in claim 39, wherein the means for recognizing and the means for recognizing selected pictorial attributes of the first body part only examines a small percentage of the total image being received from the camera means, said percentage being less than about 15 percent.

41. Vision apparatus as in claim 40, wherein the first body part has a plurality of areas spaced from one another which are significantly visually darker than adjacent areas of the first object, and the vision apparatus further comprises:
(d) lighting means for providing increased visual contrast between the plurality of visually darker areas of the first body part and the lighter areas of the first body part adjacent thereto.

42. Vision apparatus as in claim 39, wherein:
the camera means is used for acquiring successive images of a first scene wherein the first body part or a second body part distinctly different from the first body part may be present; and
the image analysis system further includes (4) means for recognizing selected pictorial attributes of the second body part when such attributes are present in at least one of the successive images, (5) means for comparing the recognized attributes of the second body part with corresponding reference data from a second set of information from images of a prototypical first automotive body part previously stored in the system, and (5) means for identifying the second body part as being present in the first scene when a match within a predetermined second tolerance exists between at least a plurality of the recognized pictorial attributes and corresponding reference data from the second set of information; and
the vision further comprises (d) means for communicating the identification of the second body part as being present in the first scene to the automated painting equipment.

43. Vision apparatus for automated painting equipment which paints automotive body parts passed thereby on an automated conveying system, comprising:
(a) camera means for acquiring successive images of a first scene from a first portion of the painting equipment, which scene typically includes from time to time at least a first movable automotive body part passing therethrough, but which may include a human being entering therein; and
(b) an image analysis system for digitally processing successive images received from said camera means, said system including (1) means for recognizing selected pictorial attributes of the human being when such attributes are present in at least one of the successive images, (2) means for comparing the recognized attributes of the human being with corresponding reference data from a first set of information derived at least in part from images of a prototypical first automotive body part previously stored in the system, and (3) means for identifying the human being as being present in the first scene when a match within a predetermined first tolerance exists between at least a plurality of recognized pictorial attributes and corresponding reference data from the first set of information; and
(c) means for communicating to the automated painting equipment that the presence of a human being has been detected in the first scene.

44. Vision apparatus as in claim 43, wherein:
the camera means is also used for acquiring successive images of the first scene to recognize when at least a first automotive body part is present in the first scene and when such first body part has reached a predetermined location; and the image analysis system further includes (4) means for recognizing selected pictorial attributes of the first body part when such attributes are present in at least one of the successive images, (5) means for comparing the recognized attributes of the first body part with corresponding reference data from a first set of information derived at least in part from images of a prototypical first automotive body part previously stored in the system, (6) means for identifying the first body part as being present in the first scene when a match within a predetermined first tolerance exists between at least a plurality of recognized pictorial attributes and corresponding reference data from the first set of information, and (7) means for determining when the first body part has moved into the scene sufficiently to have reached the predetermined location; and the means for communicating with the automated painting equipment including means for informing such equipment when the first body part has been positively identified as being present in the first scene.

45. Vision apparatus for automated painting equipment which paints automotive body parts passed thereby on an automated conveying system, comprising:

(a) camera means for acquiring successive images of a first scene from a first portion of the painting equipment including at least a first automotive body part moving in a first direction and to be identified via selected pictorial attributes thereof and including at least one object forming part of a painting machine which moves in a second direction transverse to the first direction; and (b) an image analysis system for digitially processing successive images received from said camera means, said system including (1) means for recognizing selected pictorial attributes of the first body part when such attributes are present in at least one of the successive images, (2) means for comparing the recognized attributes of the first body part with corresponding reference data from a first set of information derived at least in part from images of a prototypical first automotive body part previously stored in the system, (3) means for determining the relative location of at least part of the first body part within the first scene when a match within a predetermined first tolerance exists between at least a plurality of recognized pictorial attributes and corresponding reference data from the first set of information, (4) means for recognizing selected pictorial attributes of the object forming part of the painting machine when such attributes are present in at least one of the successive images at the same time selected attributes of the first object are present therein, (5) means for comparing the recognized attributes of the object with corresponding reference data from a second set of information about the object previously stored in the system, and (6) means for determining the relative location of at least part of the painting machine within the first scene when a match within a predetermined first tolerance exists between at least a plurality of recognized pictorial attributes of the object and corresponding reference data from the second set of information, and (7) means for determining from at least one of the successive images an actual distance between a selected portion of the painting machine and a portion of the body part nearby the selected portion of the painting machine based at least in part upon the determined relative locations of object and the first body part; and (c) means for communicating to the automated painting equipment information related to the value of the determined distance, whereby the actual distance between the selected portion of the painting machine and the selected portion of the first body part can be adjusted if necessary.

46. Vision apparatus as in claim 45, wherein the image analysis system further includes:

(7) means for comparing the determined distance against a plurality of predetermined values representing maximum and minimum operating distances to be maintained between the selected first portion of the object and the body part during painting, and wherein the vision apparatus further includes (d) means for communicating to automated painting equipment when the determined distance is outside of the maximum and minimum operating distances.

47. Vision apparatus as in claim 46, wherein the minimum distance is a minimum safe clearance distance, and wherein the apparatus further comprises:

(d) means for commanding the automated painting equipment to take remedial action when the determined actual distance is below the minimum safe distance so that automated painting equipment will cause the determined actual distance to become larger promptly.

* * * * *

UNITED STATES PATENT AND TRADEMARK OFFICE
CERTIFICATE OF CORRECTION

| | | |
|---|---|---|
| PATENT NO. : | 4,941,182 | Page 1 of 2 |
| DATED : | July 10, 1990 | |
| INVENTOR(S) : | P. Patel | |

It is certified that error appears in the above-indentified patent and that said Letters Patent is hereby corrected as shown below:

In the Abstract, line 2, delete "intrustion" and insert ---- intrusion ----.

Column 1, line 54, after "will" insert ---- be ----.

Column 2, line 39, delete "person" and insert ---- persons ----.

Column 3, line 2, before "painted" insert ---- be ----.

Column 3, line 16, after "may" insert ---- be ----.

Column 3, line 60, delete "passed" and insert ---- pass ----.

Column 4, line 10, after "will" insert ---- be ----.

Column 5, line 63, delete "from" and insert ---- form ----.

Column 5, line 64, after "to" insert ---- be ----.

Column 6, line 53, delete "taking" and insert ---- taken ----.

Column 6, line 65, after "is" insert ---- a ----.

Column 10, line 61, delete "vary" and insert ---- very ----.

Column 12, line 9, after "such" insert ---- as ----.

Column 14, line 58, delete "preformed" and insert ---- performed ----.

Column 16, line 2, delete "in" and insert ---- is ----.

Column 16, line 20, delete "track" and insert ---- truck ----.

Column 16, line 41, delete "an area of approximately".

Column 20, line 57, after "signal" insert ---- to ----.

UNITED STATES PATENT AND TRADEMARK OFFICE
CERTIFICATE OF CORRECTION

PATENT NO. : 4,941,182
DATED : July 10, 1990
INVENTOR(S) : P. Patel

It is certified that error appears in the above-indentified patent and that said Letters Patent is hereby corrected as shown below:

Column 24, line 34, after "object" insert ---- being painted in order to properly distribute the paint over the object ----.

Column 26, line 39, after "vision" insert ---- system ----.

Column 31, line 31, delete "to" (first occurrence).

Column 34, line 32, after "vision" insert ---- system ----.

Signed and Sealed this

Seventh Day of June, 1994

Attest:

BRUCE LEHMAN

Attesting Officer   Commissioner of Patents and Trademarks